Feb. 21, 1961
M. A. GOODBAR ET AL
2,972,442
AUTOMATIC CHANGE DISPENSING CASH REGISTER
Filed July 12, 1954
9 Sheets-Sheet 1

INVENTORS
MAYO A. GOODBAR
DONALD E. COFFEY
GEORGE A. COCUP &
ROGER S. HULL
BY Earl Beust
Henry Silberis
THEIR ATTORNEYS

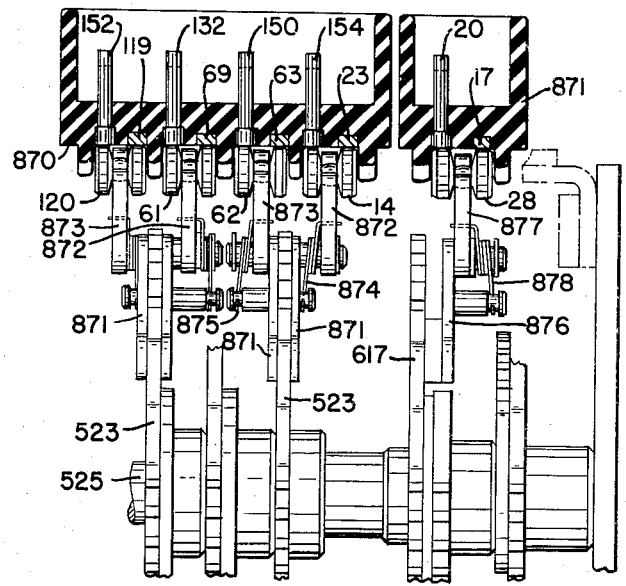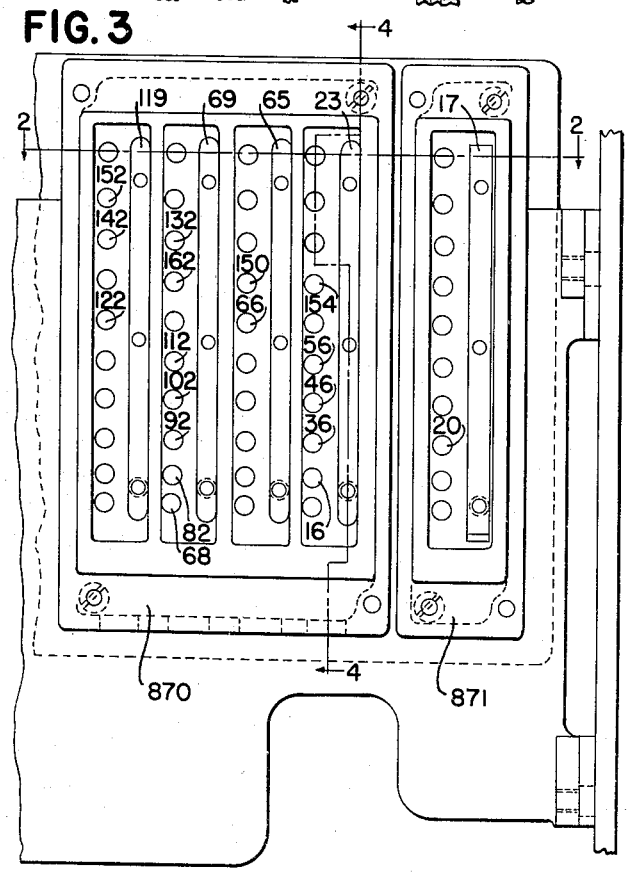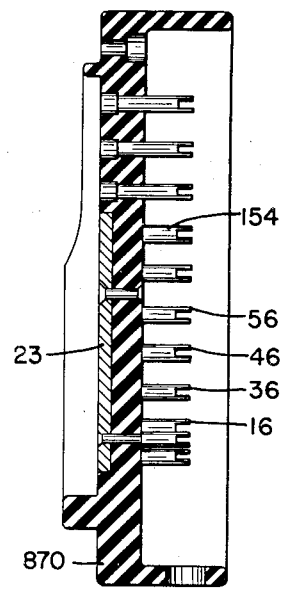

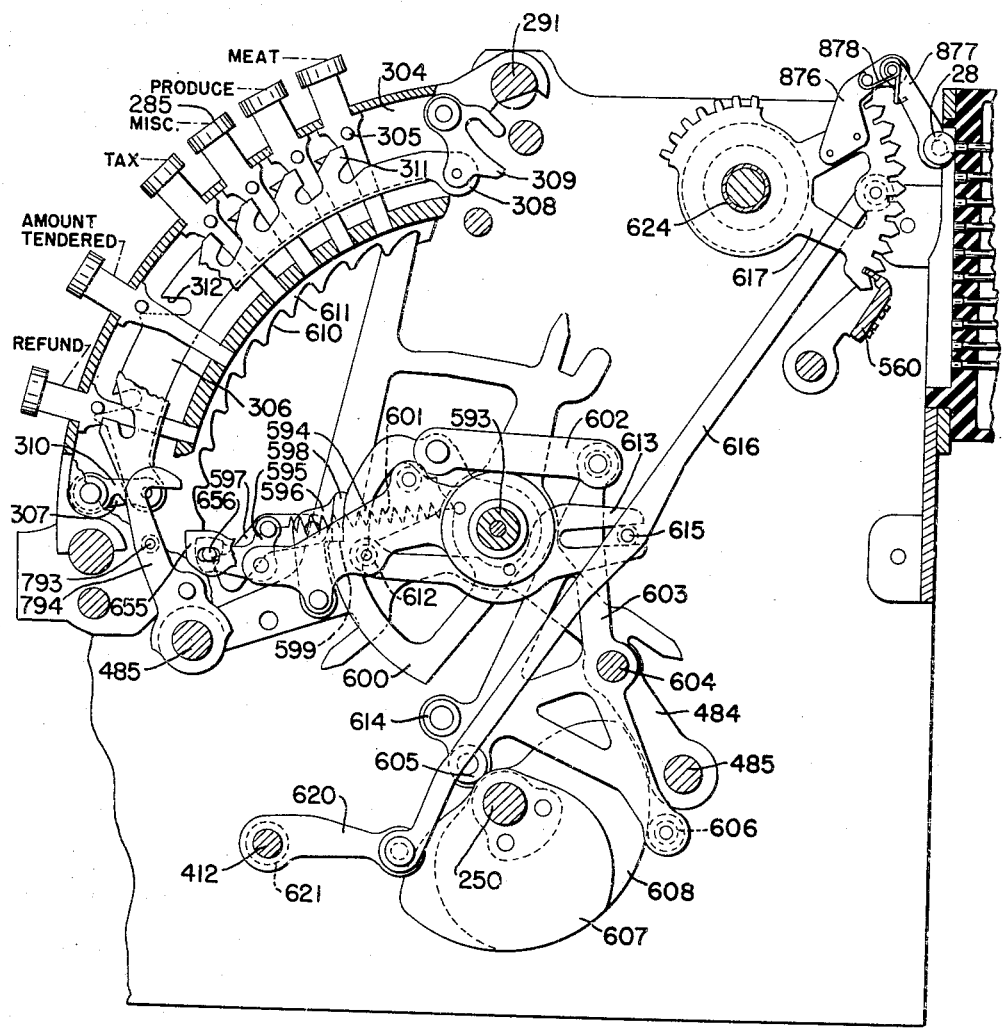

Feb. 21, 1961  M. A. GOODBAR ET AL  2,972,442
AUTOMATIC CHANGE DISPENSING CASH REGISTER
Filed July 12, 1954  9 Sheets-Sheet 5
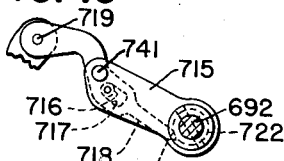
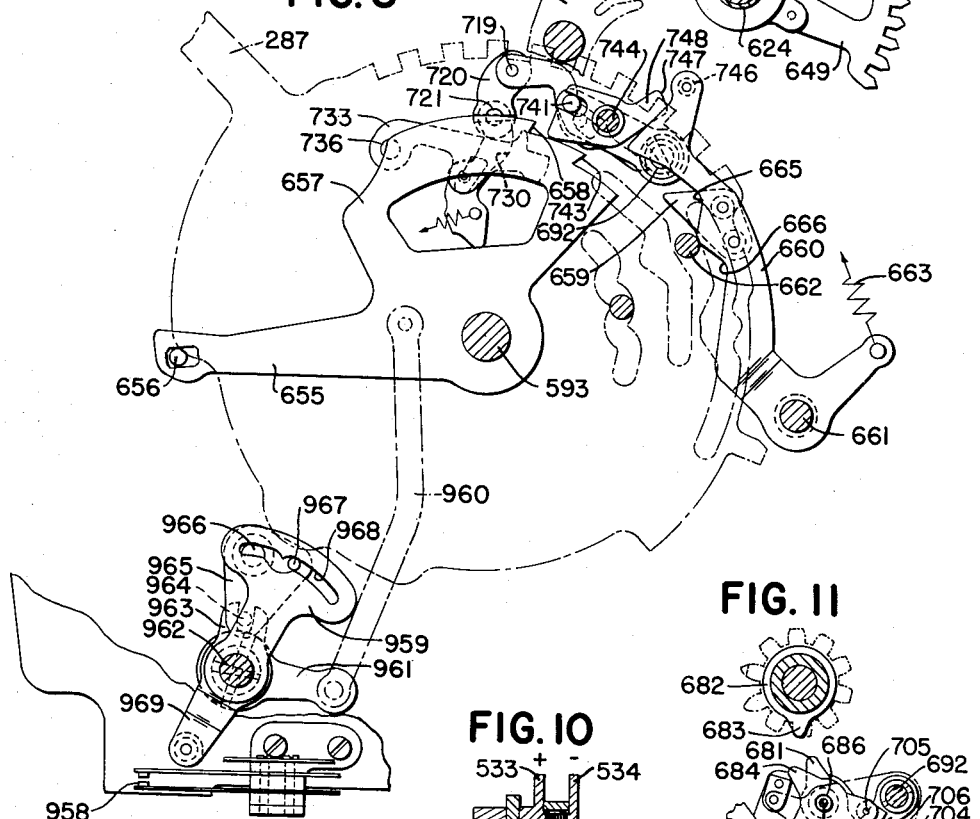
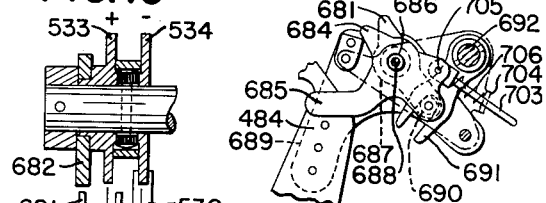
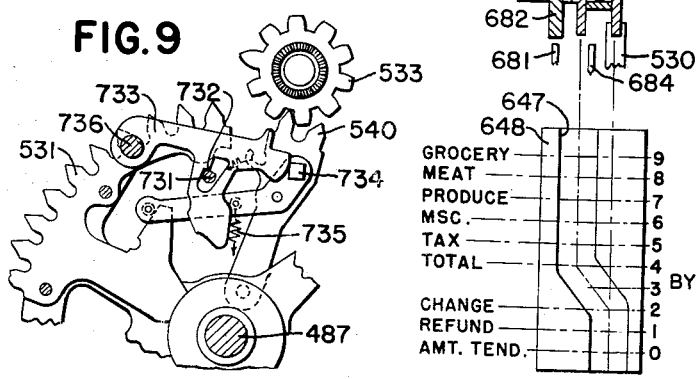
INVENTORS
MAYO A. GOODBAR
DONALD E. COFFEY
GEORGE A. COCUP &
ROGER S. HULL
BY
THEIR ATTORNEYS Feb. 21, 1961 M. A. GOODBAR ET AL 2,972,442
AUTOMATIC CHANGE DISPENSING CASH REGISTER
Filed July 12, 1954 9 Sheets-Sheet 6
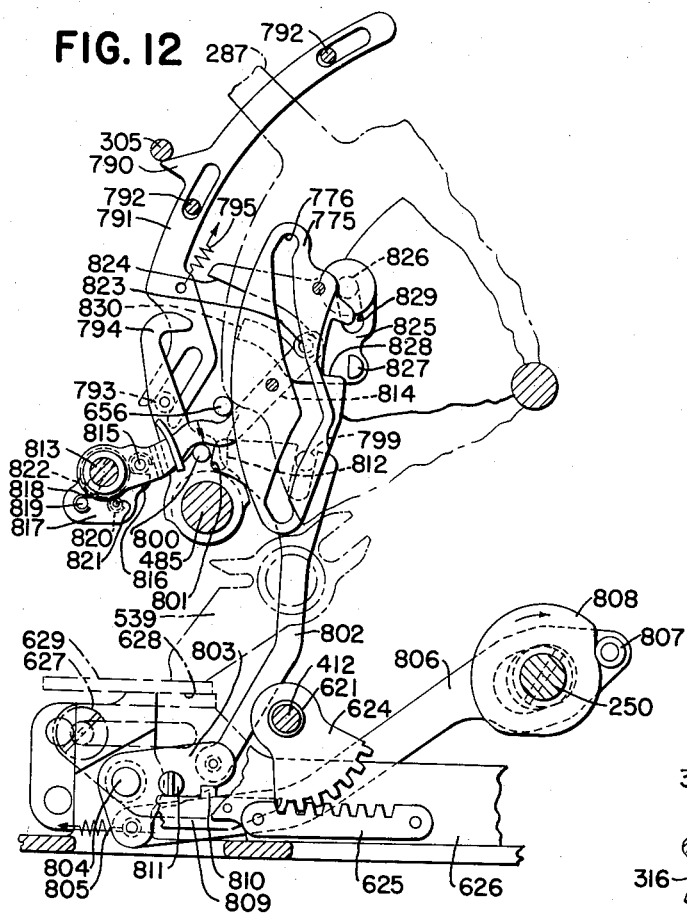
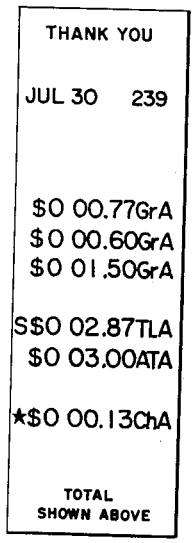
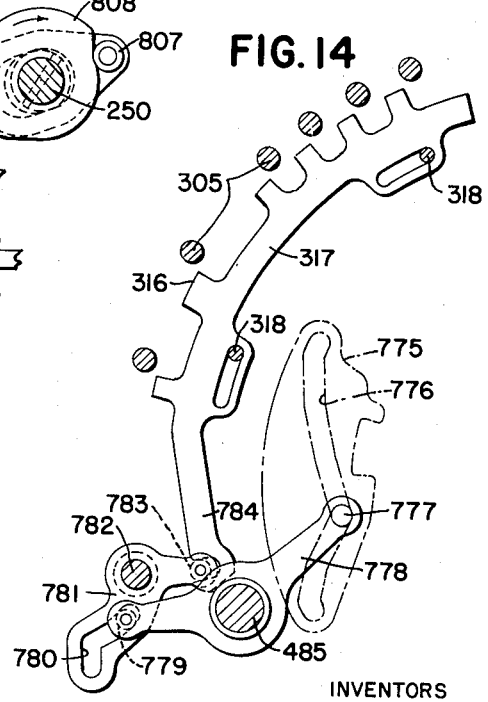
INVENTORS
MAYO A. GOODBAR
DONALD E. COFFEY
GEORGE A. COCUP &
ROGER S. HULL
BY
THEIR ATTORNEYS

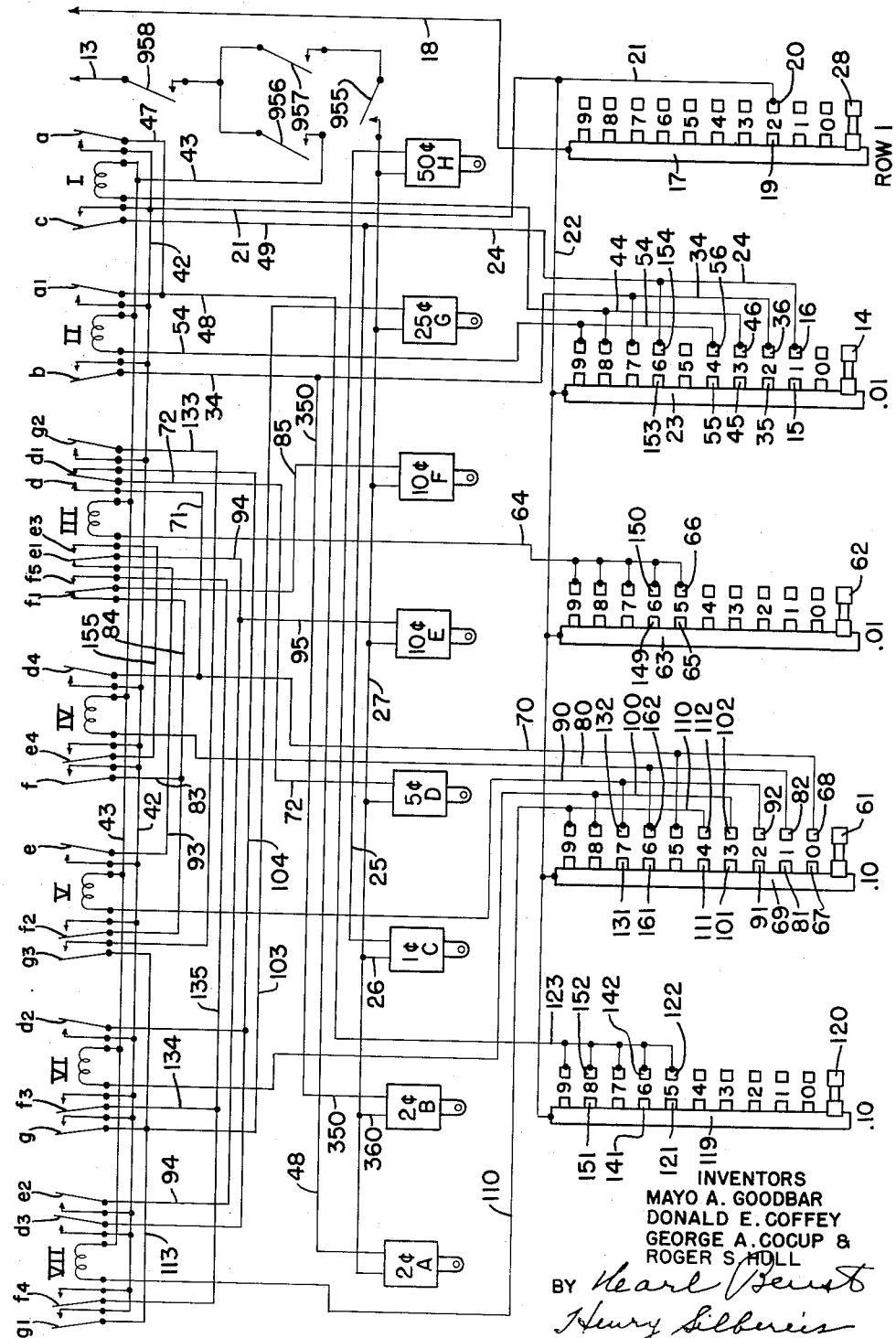

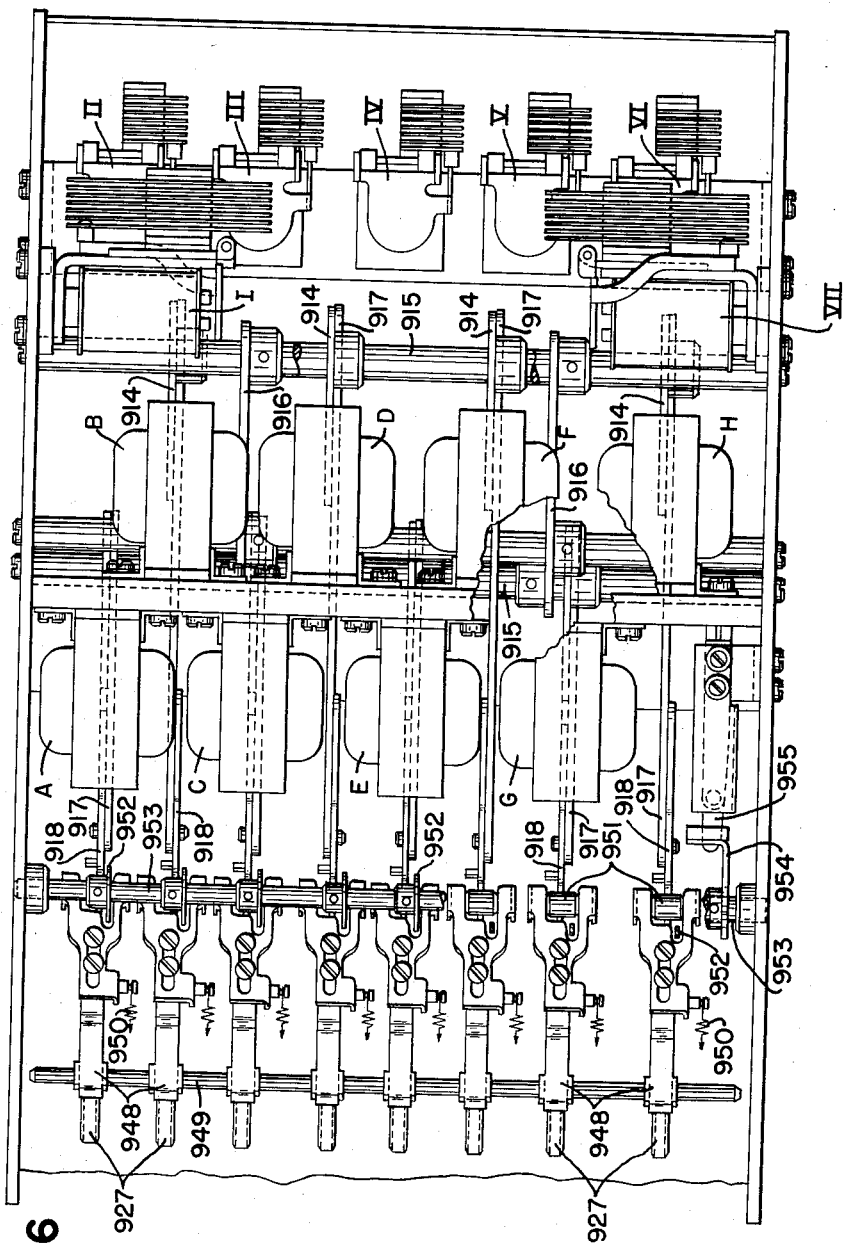

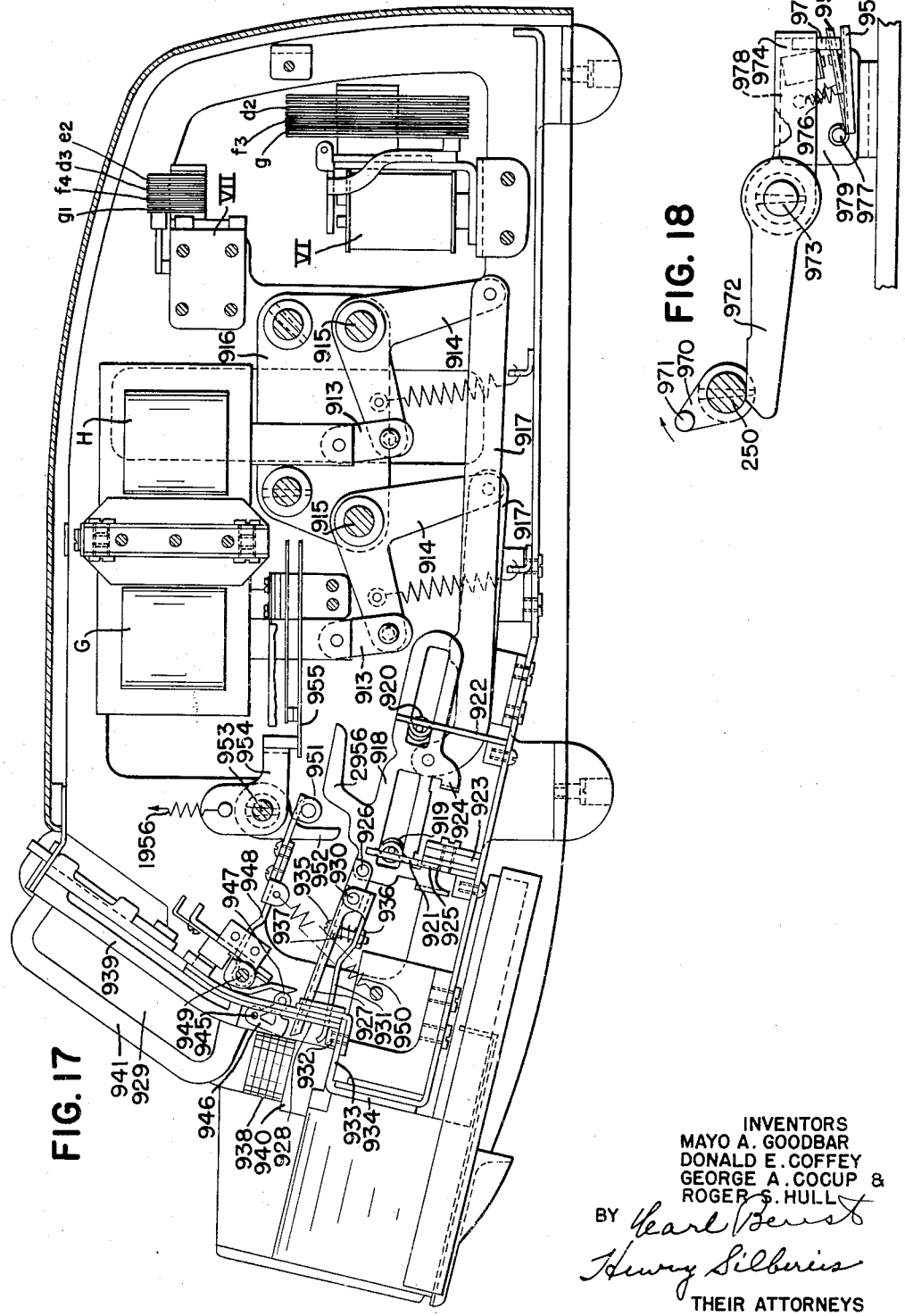

United States Patent Office 2,972,442
Patented Feb. 21, 1961

2,972,442

AUTOMATIC CHANGE DISPENSING CASH REGISTER

Mayo A. Goodbar, Donald E. Coffey, George A. Cocup, and Roger S. Hull, Dayton, Ohio, assignors to The National Cash Register Company, Dayton, Ohio, a corporation of Maryland Filed July 12, 1954, Ser. No. 442,786

8 Claims. (Cl. 235—7)

This invention relates to improvements in automatic controls, set up by a cash register, for calculating the amount of change due a customer, and for automatically delivering the change so calculated, upon operation of the cash register.

The invention is disclosed applied to machines of the type shown in United States Patent No. 1,865,147, issued to Bernis M. Shipley on June 28, 1932, and United States Patent No. 1,850,198, issued to Edward J. Brandt on March 22, 1932.

The specific invention comprises automatic controls, set up by a machine of the type disclosed in said Shipley patent, for operating a machine of the type disclosed in said Brandt patent, whereby the coins are automatically delivered upon operation of the Shipley type of machine.

It is an object of the present invention to provide a machine, having the above type of mechanism, whereby the change is automatically computed and delivered to the customer.

Another object is to provide a machine of the class described with an "Amount Tendered" key, operation of which causes the amount of money tendered to be entered into the machine to cause a computation in the machine to determine whether or not the customer has any change coming and, if so, deliver the change automatically.

Another object of the present invention is to provide a machine of the above type with an add-subtract totalizer, which totalizer controls the change-making mechanism to automatically deliver the proper change computed on the totalizer, so that the operator does not have to compute the amount of change from the amount of money tendered to her.

With these and incidental objects in view, the invention consists of certain novel features of construction and combinations of parts, a preferred form or embodiment of which is hereinafter described with reference to the drawings which accompany and form a part of this specification.

Of said drawings:

Fig. 2 is a sectional view showing the automatic switch arrangement for controlling the change-making mechanism, and is taken on line 2—2 of Fig. 3.

Fig. 3 is an elevational view of the switch contacts for controlling the change-maker.

Fig. 4 is a cross-sectional view taken on line 4—4 of Fig. 3.

Fig. 7 is a cross-sectional view of the transaction bank and its differential mechanism.

Fig. 8 is a side elevational view of the mechanism for automatically selecting the proper side of the add-subtract totalizer for total-taking operations and also a switch in the circuits for controlling the issuance of coins during total-taking operations.

Fig. 9 is a detail view of the tens transfer mechanism for the add-subtract totalizer.

Fig. 10 is a detail view of one denominational element of the add-subtract totalizer, together with a diagrammatic showing of the shifting cam therefor.

Fig. 11 is a detail view of the "fugitive 1" mechanism for the add-subtract totalizer.

Fig. 12 is a detail side elevational view of certain of the interlocks for enforcing certain sequences of machine operations.

Fig. 13 is a facsimile of a receipt issued by the machine.

Fig. 14 is a detail view of certain interlocks on the machine.

Fig. 15 is a diagram showing the circuits for controlling the issuance of coins from the change-making machine.

Fig. 16 is a top plan view of the coin-issuing mechanism.

Fig. 17 is a side elevational view of the coin-issuing mechanism.

Fig. 18 is a detail view of the switching mechanism for controlling the time of operation of the coin-issuing mechanism.

GENERAL DESCRIPTION

Figure 1:
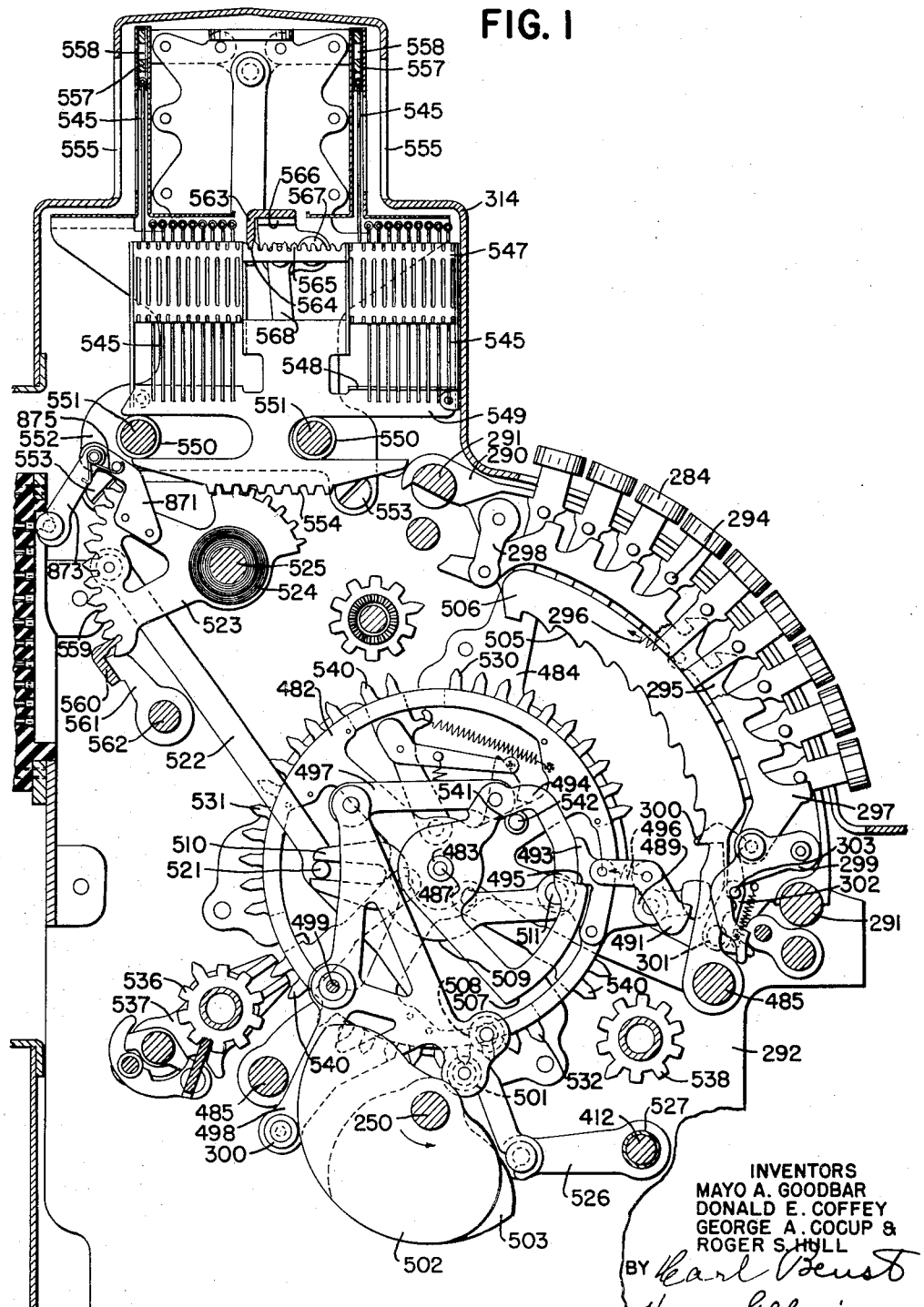
Fig. 1 is a cross-sectional view showing an amount bank and an amount differential for entering amounts into the various totalizers.

Described in general terms, the machine, in the preferred form of embodiment disclosed herein, comprises a machine of the type shown in the above-mentioned Shipley patent, which is capable of recording items of a sales transaction, either multiple or single, and printing a sub-total thereof. The machine is also provided with a control for entering the amount tendered by a customer in payment for goods purchased as indicated by the sub-total that has been recorded. The "Amount Tendered" key controls an add-subtract totalizer, so that the amount tendered is subtracted from the balance standing thereon, which provides a negative balance, or the amount of change to be issued. Upon clearing the negative total balance from the machine, certain circuits are set up automatically to activate solenoids in the change-making mechanism to automatically issue the proper coins making up the change due the customer. The change-making and -delivering operation is effected during the negative total clearing operation of the machine. Therefore, no mental calculation on the part of the operator is required to determine the amount of coins due the customer.

The present invention contemplates the automatic issuance of coins and does not issue the currency. However, machines of the type disclosed in the Shipley patent are provided with indicators on which the balance is indicated during the operation of the machine in which the amount of change due the customer appears. The operator can read the indicators and determine the amount of currency due the customer therefrom, and make the currency change from the cash drawer accordingly.

Machines of the type shown in the Shipley patent issue an itemized receipt, like that illustrated in Fig. 13 herein. This figure indicates that three items were sold and a sub-total was printed. It also indicates that the customer tendered three dollars ($3.00), which is subtracted from the sub-total, leaving a negative balance, which represents the amount of change to be issued as 13 cents, which is automatically issued when the amount of 13 cents is printed by the machine.

Amount keys

The amount keys 284 (Fig. 1) of each amount bank are mounted in an individual frame 290 mounted on cross rods 291 supported by side frames 292, only one being shown. The keys 284 are retained in their normal, outer, positions by the usual compression springs (not shown herein).

Each of the keys 284 carries a pin 294, extending from both sides of the key. That part of the pin 294 which extends to the right side of the key cooperates with the usual retaining detent 295, which is normally held in the position shown by a spring 296, to retain the depressed key in its depressed position. Depression of the key causes its stud to move the detent 295 downwardly until the pin has passed the hook of the detent, whereupon the spring 296 restores the detent 295 into the position shown to retain the key in its depressed position until it is released by the machine near the end of the operation. The above is well known in the art and is described in detail in the Shipley patent above referred to.

Cooperating with the keys 284 and their pins 294 is a control bar 297, mounted on arms 298 and 299, supported by the key frame 290. As is well known in the art, the keys 284, when depressed, control the differential positioning of a differential mechanism to be described hereinafter, which is shown in Fig. 1.

Also associated with each bank of keys is a zero stop pawl 300, which is mounted on a shaft 301, supported in the key frame 290. Also secured to the shaft 301 is an arm 302, carrying a pin 303, cooperating with the arm 299.

From the above description it can be seen that, whenever any one of the amount keys 284 is depressed, its pin 294 moves the control bar 297 downwardly, whereupon the arm 299, through engagement with the pin 303, rocks the arm 302, the shaft 301, and the zero stop pawl 300 clockwise from the position shown in Fig. 1 into a position wherein the zero stop pawl is not engaged by the differential mechanism, to be described hereinafter, and consequently the differential will be positioned under control of the depressed key. However, when no key in a bank is depressed, the zero stop pawl remains in the position shown and causes the differential mechanism to be stopped in the zero position.

Transaction keys

The transaction key bank (Fig. 7) includes six keys 285, designated "Meat," "Produce," "Misc.," "Tax," "Amount Tendered," and "Refund." In the present invention, all of these transaction keys 285 are motorized; that is, the machine is released for operation upon depression of any one of the keys of this bank. The transaction keys 285 are carried by a key frame 304, supported on the previously-mentioned rods 291. These keys 285 are held in their normal, outer, positions by the usual key springs (not shown), which springs are also used to restore the depressed keys to their normal positions at each operation, as is old and well known in the art.

Each of the transaction keys 285 is provided with a pin 305 (Fig. 7). These pins cooperate with a machine-releasing bar 306 mounted on a pair of arms 307 (only one of which is shown), which arms are carried by the key frames 304. These pins 305 also cooperate with a locking detent 308, carried by arms 309 and 310, which are mounted on the key frame 304. The detent 308 is provided with locking noses 311, which, when the detent is moved to the right, as viewed in Fig. 7, upon release of the machine and by means well known in the art, engage over the top of the pin 305 of the depressed key and will be positioned beneath all of the rest of the pins 305 on the undepressed keys to prevent those keys from being depressed while at the same time locking in depressed position the particular key 285 which has been depressed. The above-described release of the machine is accomplished in certain instances upon depression of any of the keys 285, when their pins, by contact with a slot 312 of the bar 306, move the bar 306 downwardly to operate part of the release mechanism, as is well known in the art. These pins 305 cooperate with lugs 316 (Fig. 14) on an interlocking bar 317, mounted to slide on pins 318, which in turn are carried by the key frame 304. This interlocking bar 317 is adapted to be moved by a total lever 287 (Fig. 12) by means to be described hereinafter. The total lever 287 is used, as has been fully illustrated and described in the above-mentioned Shipley Patent No. 1,865,147, for the purpose of controlling the machine for various types of operations, such as add, subtotal-taking, and total-taking operations.

Specific example

The machine, as illustrated herein to describe the invention, is what is known as an itemizing totalizing machine, and each of the particular transactions, whether it be a single-item transaction or a multiple-item transaction, is totaled at the completion of the transaction by movement of the total lever 287 down one step from its "add" position, in which position it is shown in Fig. 12. In connection with the change computation, after several items have been registered, the operator moves the total lever 287 up one step into "sub-total" position and then presses a motor bar (not shown), which causes an operation of the machine to indicate on the indicators, to be described hereinafter, the amount of the customer's purchases.

Assume that the amount of the customer's purchase is $2.87 and that the customer tenders $3.00 to the operator. When this occurs, the operator sets up $3.00 on the amount keys 284 and presses the "Amount Tendered" key, which releases the machine for operation. The amount $3.00 is indicated and printed. The operator then moves the total lever 287 into the first position below "add" position, which is the "item total" position, and presses, in this particular case, the motor bar. The machine is released on depression of the motor bar, and a normal operation follows, near the end of which the total lever 287 is automatically restored to its normal, "add," position, the cash drawer is opened, the receipt is issued, and the indicators are set to show the amount of change due the customer, which in this particular case is 13 cents. During this last operation, the machine automatically computes the amount of change which the customer has coming out of his $3.00, and automatically sets control switches to activate and operate the change delivery mechanism to deliver 13 cents to the customer.

Amount differential mechanism

The amount differential mechanism shown in this case in connection with one bank is substantially identical with the amount differential mechanism shown in the above-mentioned Shipley Patent No. 1,865,147, and therefore only a brief description thereof will be given herein.

Figure 5:
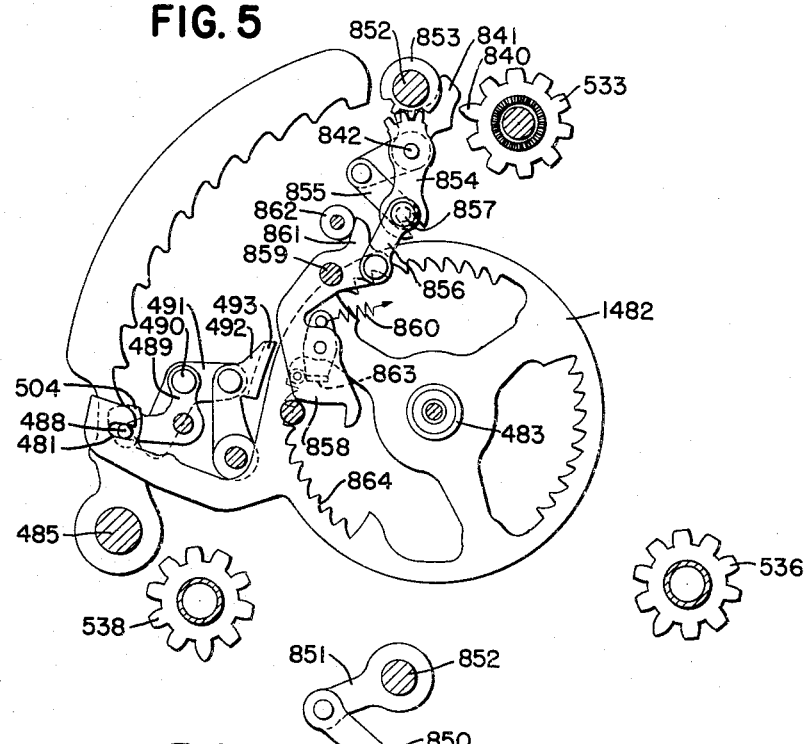
Fig. 5 is a detailed side view showing the mechanism for controlling the setting of the amount differential mechanism during total-taking operations.

Depression of any one of the amount keys 284 (Fig. 1) rocks the previously-described zero stop pawl 300 clockwise out of the path of the usual reset spider 1482 (Fig. 5). The reset spider 1482 is freely mounted on the hub of the amount differential actuator 482 (Fig. 1), rotatably supported on a bushing 483, extending between two hangers or support plates 484 (only one of which is shown here), said plates being in turn supported in the usual manner by rods 485, extending between the machine side frames 292. There is a pair of supporting plates 484 for each amount differential, and a tie rod 487 extends through the holes in the center of the bushings 483 to secure all of the amount differentials in a compact unit.

A notch 481 in the forward end of the above-mentioned reset spider engages a stud 488 in the forward extension of a bell crank 489, pivoted on an extension of the actuator 482. Carried by the vertical arm of the bell crank 489 is a stud 490, on which is pivoted an arm 491, which is also pivoted to the upper end of a latch 492, pivotally mounted on the actuator 482. The latch 492 has a foot 493, normally held in contact with the periphery of a driving segment 494, just above the shoulder 495 thereon, by means of a spring 496. The driving segment 494 is rotatably supported on the hub of the actuator 482. A link 497 pivotally connects the driving segment 494 to a cam lever 498, pivoted on a stud 499 in the left-hand one of the plates 484, said lever 498 carrying rollers 500 and 501, which coact with the peripheries of cams 502 and 503, respectively, secured to a main cam shaft 250. Depression of any one of the amount keys 284 moves its lower end into the path of a rounded surface 504 of the bell crank 489. In adding operations, the main cam shaft 250 and the cams 502 and 503 make one counter-clockwise rotation, as viewed in Fig. 1, causing the lever 498 to rock the driving segment 494 first counter-clockwise and then clockwise back to normal position. Counter-clockwise movement of the segment 494 causes the shoulder 495, in cooperation with the foot 493 of the latch 492, to carry the latter and the amount actuator 482 counter-clockwise in unison until the rounded surface 504 contacts the stem of the depressed key 284. This causes a clockwise rocking of the bell crank 489, which, through the arm 491, disengages the foot 493 of the latch 492 from the shoulder 495, to arrest counter-clockwise movement of the actuator 482, to position said actuator according to the value of the amount key 284 which has been depressed.

The disengagement of the latch 492 moves the forward extension of the arm 491 into engagement with one of a series of locating notches 505 in a plate 506, which is mounted between the forward rod 485 and the upper extension of the left-hand supporting plate 484.

As the latch 492 is disengaged from the shoulder 495, an arcuate surface 507 on the segment 494 moves opposite the foot 493 to retain the latch and the corresponding differential mechanism in their set positions.

When the levere 498 reaches the terminus of its counter-clockwise movement, a roller 508, carried thereby, contacts an arcuate surface 509 on a beam 510, pivoted on a stud 511, carried by the actuator 482, and forces a concave surface on the upper edge of the beam into contact with the hub of the actuator 482, to move the rear end of the beam 510 into a position commensurate with the value of the depressed key 284.

The rear end of the beam 510 is bifurcated to receive a stud 521 on a link 522, the upper end of which is pivoted to a segment 523, secured to one of a series of nested sleeves 524, supported on the shaft 525, carried by the side frames 292. Each of the segments 523 is adapted to control mechanism to select the proper indicators to indicate, toward the front and back of the machine, the values of the keys which have been depressed. This indicating mechanism will be described hereinafter.

The lower end of the link 522 is connected to an arm 526, secured to one of a series of nested sleeves 527, supported by a shaft 412. These arms 526 are used to set up and control printing mechanism, which is not shown herein but which is shown and described in the above-mentioned Shipley Patent No. 1,865,147.

Each of the actuators 482 carries three sets of gear segments, 530, 531, and 532, which cooperate with lines of totalizers to cause the values of the depressed amount keys to be accumulated into the selected one or more of the totalizers on these particular lines, in the manner which is old and well known in the art and which also is fully illustrated and described in the above-mentioned Shipley patent.

The gear segment 530 actuates a totalizer on the upper line. This totalizer is an add-subtract totalizer, consisting of add pinions 533 and subtract pinions 534 (Fig. 10), to control additions into and subtractions from this totalizer. This totalizer is carried by the usual shiftable frame 535 (Fig. 8).

Also, the amount tendered is subtracted from the amount of the sale made to any particular customer. In other words, if the customer has purchased $3.50 worth of goods or produce and tenders the clerk $3.50, this amount tendered, $3.50, will be subtracted from the amount $3.50 in the item totalizer, to reset it to zero.

On the other hand, if the customer has purchased, say, $3.50 worth of merchandise and tenders the operator a $5.00 bill, the amount of $5.00 will be subtracted from the $3.50 in the item totalizer, leaving an overdraft of $1.50, which is the amount of change which the customer has coming to him and which will be indicated on the indicators, to be described hereinafter. Also, a fifty-cent piece will be delivered to the customer automatically. The $1.00 in currency is taken out of the cash drawer by the operator and handed to the customer.

The gear segment 531 (Fig. 1) actuates the totalizers 536 on the back totalizer line. This totalizer is carried by the usual sliding frame 537. The gear segment 532 actuates the totalizers 538 on the front totalizer line. These totalizers 538 are carried by the usual sliding frame, similar to the frame 537 but not shown herein.

Whenever one of the pinions of the totalizers 536 or 538 on the back and front totalizer lines, respectively, or whenever one of the pinions 533 or 534 of the add-subtract totalizer on the upper totalizer line passes from "9" to "0," the transfer mechanism is tripped, causing "1" to be added upon the totalizer pinion of the next higher denomination. Pivotally supported by the differential actuator 482 and associated with each of the gear segments 530, 531, and 532 is a transfer arm 540 (Figs. 1 and 9), there being three transfer arms altogether, one for each differential unit. Each arm 540 has two teeth like the teeth of the differential segments 530, 531, and 532.

The transfer tripping mechanism associated with these three transfer arms 540 for the three totalizer lines is the same as that which has been fully illustrated and described in United States Letters Patent No. 1,619,796, granted to Bernis M. Shipley on March 1, 1927, and reference may be had to that patent if a more detailed description of the transfer mechanism is desired.

The differential actuator 482 is restored from its differentially-set position each operation of the machine by a shoulder 541, on the driving segment 494, contacting a stud 542, carried by the differential actuator 482, when the driving segment 494 is moved clockwise to its home position, shown here in Fig. 1.

*Indicators*

The indicating mechanism disclosed in connection with the present machine is substantially the same as that fully illustrated and described in United States Letters Patent No. 1,163,748, issued to Frederick L. Fuller on December 14, 1915. Therefore, but a brief description of the indicating mechanism will be given herein.

There are two groups of indicators 545 (Fig. 1) for each of the banks of amount keys 284. When in raised position, one group of indicators is visible from the front of the machine, and the other group is visible from the back of the machine. Likewise, two groups of indicators are associated with the bank of transaction keys 285. These indicators associated with the transaction keys are not shown, but, except for the indicia thereon, they are identical with the indicator shown in Fig. 1 as associated with the amount banks. Therefore, as all of these indicators are similarly mounted, the group associated with one of the amount banks only is illustrated and will be described.

The groups of indicators 545 are carried in a carriage 547 and rest upon ledges 548 of a runner 549, slidably mounted on rollers 550, on rods 551, supported by plates 552, secured to the machine frames 292 by screws 553. The runner 549 has teeth 554, meshing with the previously-described segment 523, which is differentially positioned by the beam 510 and the link 522 under control of the differential mechanism set by the amount keys 284. In this manner, the carriage 547, carrying the groups of indicators 545, is differentially positioned to bring any desired indicator 545, one in the front group and one in the back group, into cooperative relationship with the indicator-lifting means.

As the indication from the back of the machine is the reverse of that seen from the front, all of the various groups of front and back indicators cannot be mounted on runners like the runner 549 but must be carried by separate runners, and the back indicators must be differentially positioned from the segment 523, which operates the front indicator, by the sleeves 524, which carry a second segment similar to the segment 523 and mesh with the rack formed in the back indicator runner. This is all old and well known and is fully illustrated and described in the above-mentioned Fuller Patent No. 1,163,748.

The indicator-lifting mechanism also is substantially the same as that shown and described in the above-mentioned Fuller patent. After the indicator carriages 547 have been differentially positioned according to the keys depressed, the selected indicators are exposed to view by a lifter frame 557, having, at its front and back projections 558, adapted to raise the selected indicators to view. Before the carriages 547 are differentially positioned, the indicators exposed during the previous operation are lowered to their normal positions by the frame 557. The raised indicators are exposed to view so that the indicia thereon may be read by the customer and by the clerk through the openings 555 in the front and back of the cabinet casing 314.

Each of the previously-described segments 523 has alining notches 559, with which cooperate the usual aliners 560, integral with the arms 561, secured to a shaft 562.

This shaft 562 is rocked counter-clockwise (Fig. 1) to disengage the aliner 560 from the segment 523 prior to the differential positioning of the segments, and then, after they have been positioned, the shaft 562 is rocked clockwise to cause the aliner 560 to engage the notches 559 to aline the segments 523 in differentially-set positions.

There is another alining mechanism which directly alines the runners 549 of the indicator carriage 547. This aliner, 563, is in the form of an angle iron. In alinement with each runner 549, the aliner 563 has a slot, which guides the runners in their movements, and also an aliner tooth 564, which cooperates with teeth 565, formed in the runner 549. The aliner 563 is secured at each end to the horizontal portion of an arm 566, pivoted on studs 567, mounted in the plates 552. Pivoted to the arms 566 are links 568, which are pivoted to arms (not shown) secured to the shaft 562, which, has been previously described, is rocked to operate the aliner 560, and therefore, simultaneously with the movement of the aliner 560, the aliners 564 and 563 are operated to control and aline the indicator carriages 547.

*Transaction differential*

Associated with the transaction keys 285 (Fig. 7) is a differential mechanism, including a differential arm 594, pivoted at 593 and carrying a bell crank 595, to the upper arm of which is pivoted an arm 596, which is also pivoted to a latch 597, pivoted on the differential arm 594. The latch 597 has a foot 598, normally resting above a shoulder 599 on a driver 600. A spring 601 holds the latch foot 598 normally in engagement with the driver 600. The driver 600 receives a clockwise movement (Fig. 7), and then a counter-clockwise movement to normal position, by means of a link 602, connected to and driven by a lever 603, pivoted at 604 to one of the differential plates 434. The lever 603 carries a pair of rollers 605 and 606, cooperating with and driven by a pair of cam plates 607 and 608, respectively, on the cam shaft 250.

As the driver 600 is moved clockwise, the differential arm 594, through the latch 597, is carried upwardly until the forward end 609 of the bell crank 595 strikes the inner end of one of the depressed transaction keys 285, at which time the continued movement of the driver 600 causes the latch 597 to be withdrawn from the shoulder 599, whereupon the forward end 609 of the arm 596 engages the appropriate one of a series of notches 610 in a stationary plate 611, associated with the bank of transaction keys 285.

Pivoted at 612 on the differential arm 594 is the usual beam 613, which is contacted by a roller 614 on the driving lever 603 to position the free end of the beam in accordance with the differential setting of the arm 594.

This beam 613 is slotted, as usual, to engage a stud 615 of a link 616, the upper end of which is connected to a segment 617, secured to the inner end of the nested sleeve 524 for the purpose of setting the proper indicator according to the key depressed. The segment 617 meshes with teeth on the indicator runner similar to indicator runner 549, described in connection with the amount banks, shown in Fig. 1.

The indicators associated with the transaction keys are similar to or substantially identical with those associated with the amount bank.

The lower end of the link 616 is connected to an arm 620, which is secured to a sleeve 621, mounted on the shaft 412. This sleeve 621 also has secured thereto a segmental gear for setting up type wheels in the printing mechanism, as is well known in the art and as shown and described in the above-mentioned Shipley Patent No. 1,865,147.

The previously-described aliner 560, which was described in connection with the amount differential and the amount indicators, also alines the indicator driving segment 617, shown in Fig. 7.

The beam 613, the link 616, and the arm 620 also, by means to be described hereinafter, operate a totalizer-shifting mechanism to select the proper one of a group of totalizers on the front totalizer line, according to the key which has been depressed in the transaction bank.

In other words, each of the transaction keys 285 selects one of the totalizers 538 on the front line, to have accumulated thereon the amount corresponding to the amount represented by the depressed amount keys in connection with the depression of a transaction key 285.

The connections for shifting the front totalizer frame 539 are shown partially in Fig. 12. Secured to the sleeve 621, which is operated by the beam 613 and the link 616, is a segment gear 624, which meshes with a rack 625, secured to a suitable bar 626, supported by screws 627 (only one of which is shown in Fig. 12). The bar 626 has a right-angled flange 628, having therein the usual cam slot to give a lateral movement to a totalizer-shifting bar 629, which is engaged by the totalizer frame 539 in the manner fully illustrated and described in the above-mentioned Shipley Patent No. 1,865,147.

As has been previously stated, a totalizer 538, mounted in the totalizer-shifting frame 539, as shown in Fig. 12, is associated with the transaction keys designated "Meat," "Misc.," "Produce," "Tax," and "Refund." Therefore, whenever the transaction differential mechanism of Fig. 7 is set under control of any of these keys which have been depressed, the segment gear 624 is differentially adjusted accordingly, to operate the bar 626 to cause the lateral shifting of the totalizer frame 539 to select the proper totalizer 538.

Since the totalizer-shifting mechanism is old and is fully illustrated and described in the above-mentioned Shipley Patent No. 1,865,147, it is not believed necessary to go into any further description of this totalizer-selecting mechanism.

Also, since the totalizer-engaging and -disengaging mechanism—that is, the mechanism which engages and disengages the pinions and the differential actuators—is old, that mechanism is not shown herein, and reference may be had to the Shipley Patent No. 1,619,796, previously mentioned.

As has been mentioned above, there is an add-subtract totalizer, having add pinions 533 and subtract pinions 534 (Fig. 10), and this totalizer is on the upper totalizer line. Means for shifting this totalizer frame, which is shown in Fig. 8 and designated 535, so as to select either the add pinion 533 or the subtract pinion 534 under the control of the transaction differential mechanism, will now be described. The add and subtract totalizer frame 535 has a pinion 641, projecting into a hole, and a totalizer-shifting arm 642, pivoted on a stud 643, carried by a bracket 644, supported by a bar 645, in turn supported by the side frames 292. The shifting arm 642 pivots around the stud 643 to shift the totalizer frame 535 from the add position to the subtract position, and vice versa, depending upon which ones of the keys 285 have been depressed.

The shifting arm 642 carries a roller 646, projecting into a cam race 647 (Figs. 8 and 10) of a partial drum cam 648. This partial drum cam 648 is secured to the previously-described sleeve 524, which, it will be recalled, is secured to the segment 617 (Fig. 7), operated by and under control of the keys 285 of the transaction bank.

The cam race 647, as viewed in Fig. 10, is so shaped that, when the differential mechanism associated with the transaction keys is stopped in the 0, 1, or 2 position, the subtract pinion 534 is in line with the differential actuators 530, and, when the drum cam 648 is moved under control of the transaction keys in any position between the fourth and ninth positions, the pinion 533 is in line with the differential actuator 530. As shown in Fig. 10, the 3 position is the Amount Tendered position, the 1 position is the Refund position, and the 2 position is the Change position. Therefore, when the Refund key is depressed, the subtract side (or, in other words, the pinions 534 of the add-subtract totalizer) is in position to be operated by the differential actuator, as shown in Fig. 10.

When the differential mechanism is stopped in the zero position by means to be described hereinafter, whenever the Amount Tendered key is depressed, the totalizer-shifting drum cam 648 is set in the subtract position.

Secured to the cam 648 is an aligning segment 649 (Fig. 8), which is engaged by the previously-described aliner 560 to positively and accurately aline the drum cam 648 in the position into which it has been set under control of the transaction keys.

The left end (Fig. 8) of the shifting arm 642 has two fingers 650 (only one of which is shown), which project into slots in brackets 651 (only one of which is shown) to support and guide the left end of the shifting arm 642.

*Total lever control of transaction differential*

As is well known in the art, the total lever 287 in machines of the type disclosed herein controls the setting of the transaction differential for certain operations. Pivoted on the center 593 (Figs. 7 and 8) is an arm 655, which has on its outer end a slot engaging a pin 656, carried by the previously-described bell crank 595 of the transaction differential.

As before mentioned, the bell crank 595 is carried by the differential arm 594 and is connected to the differential latch 597 by the arm 596. Integral with the arm 655 is a segment arm 657 having two shoulders 658 adapted to cooperate with a finger 659 carried by an arm 660 pivoted at 661 and normally held in contact with a pin 662, carried by the total lever 287, by a spring 663. As shown in Fig. 8, the pin 662 and the total lever 287 are in adding position.

Since the arm 655 is connected to the differential arm 594 through the pin 656, it is clear that whatever movement is imparted to the differential arm 594 under control of the keys 285 is also imparted to the arm 655 and its integral segmental arm 657. However, when the total lever 287 is moved to the "Item Total" position, which is the first position below add, the pin 662 is moved opposite a notch 665 of the arm 660, whereupon the spring 663 rocks the arm 660 counter-clockwise until a stud 746 on the upper end of the arm 660 is arrested by the end 747 of an arm 748 pivoted on a stud 744. When so arrested, the finger 659 lies in the path of the shoulder 658, which shoulder 658 corresponds to the "4th" position of the transaction differential. Therefore, the differential latch 597 will be disengaged from the driver 600 when the differential arm 594 reaches the "4" position, to position the beam 613 and the link 616 in the "4" position. Thus the indicating mechanism and the printing mechanism are properly set to indicate that an item total was taken at this time.

Also, when the differential is set in the "4" position, the drum cam 648 is rotated to the "4" position, which selects the plus side of the add-subtract totalizer; in other words, in place of the add pinion 533, in alinement with the differential actuator 530.

Whenever the total lever 287 is moved into the first position above add, which is the sub-total position, then the pin 662 on the total lever 287 is opposite a notch 666 of the arm 660, and the spring 663 then moves the finger 659 into cooperative relation with the shoulder 658. The differential arm 655 is therefore stopped in the "4" position, whereupon the beam 613 and the link 616 control the indicators and the printing mechanism to indicate that a sub-total was taken at this particular time, and also cause the setting of the drum cam 648 to select the plus side of the add-subtract totalizer.

*Overdraft mechanism per se*

After the entry of a refund which is greater than the amount of money which has been added into the plus side of the totalizer, an overdraft is created in the add-subtract totalizer; also, whenever the "Amount Tendered" is greater than the amount of the purchase, and this "Amount Tendered" is entered into the machine, it is added to the minus side of the totalizer and therefore creates an overdraft in the add-subtract totalizer. This overdraft mechanism per se will now be described.

Secured to the side of the highest order pinion 533 (Figs. 10 and 11) on the plus side of the add-subtract totalizer is a disk 682, having a node 683 on its periphery.

In subtracting operations, the add-subtract totalizer is shifted into the position shown in Fig. 10, where the minus pinions 534 may be engaged with the amount differential actuator 530 and rotated clockwise by means of well-known pinions between them, and imparts a counter-clockwise movement to the pinion 533 to rotate the latter reversely, so that the highest order plus wheel passes from "0" to "9" when an overdraft occurs. When the plus pinion 533 passes from "0" to "9" in an overdraft, the disk 682 will be rotated counter-clockwise (Fig. 11), whereupon the node 683 will coact with a projection 681 on an arm 687 to rock the latter clockwise.

The arm 687 is secured by a hub 686 to an arm 685, both of said arms and said hub being supported on a rod 688 (Fig. 11) supported on one end by the hanger plate 484 for the highest order totalizer element, and at its other end by a bracket 689, also secured to the hanger plate 484. Carried by the arms 685 and 687 is a rod 690, embraced by an arm 691 secured to a shaft 692 suitably journaled in the left-hand machine frame 292 and the highest amount hanger plate 484. It will thus be seen that both arms 685 and 687 will be rocked clockwise as a single unit, at which time the rod 690, coacting with the arm 691, rocks the latter and the shaft 692 clockwise (Fig. 10) when the totalizer is overdrawn. To aline the arms 685 and 687, the plunger 703 is slidably mounted in a lug 704 on the bracket 689. The upper end of the plunger 703 has a notched head, which engages a stud 705 carried by the arm 685. A spring 706, wound around the plunger 703 and compressed between the lug 704 and the head on the plunger, constantly maintains the latter in engagement with the stud 705. When the arms 685 and 687 are rocked clockwise, as above mentioned, the plunger 703 rocks counter-clockwise about its support a distance commensurate with the full extent of clockwise movement imparted to said arms, in which moved position the plunger 703 will retain said arms until the overdraft is removed from the crossfooter.

When the overdraft is removed from the add-subtract totalizer, the add-subtract totalizer is again shifted to the left, if not already in that position, in the old and well-known manner, so as to engage the minus side of the totalizer (namely, the pinion 534) when the add-subtract totalizer is moved into engagement with the amount differential actuators 530. Such shifting of the add-subtract totalizer will again position the disk 682 so that the node 683 thereon will be opposite the projection 681 on the arm 687. After the add-subtract totalizer has been moved into engagement with the amount differential actuators 530 and the minus pinion 534 is moved counter-clockwise thereby, the disk 682 is moved clockwise therewith, and at this time the projection 681 on the arm 687 is in its clockwise (Fig. 11), or overdrawn, position, and the node 683 on the disk 682 cannot strike the projection 681.

During the change computation operation, the minus pinions 534 are always set to "0," and the plus pinions 533 are all set to "9." During the first adding operation following a change computation operation, the totalizer wheels are shifted back to the right when the node 683 of the disk 682 is alined with the projection 681 of the arm 685. During this first adding operation following a change computation operation, which is a negative balance operation, the highest order pinion 533 passes from "9" to "0" by reason of the tens transfer mechanism being tripped across the totalizer. When this highest order pinion 533 passes from "9" to "0," the node 683 engages a projection 684 to rock the arms 685 and 687 counter-clockwise back to the position shown in Fig. 11 and, through the rod 690, impart a like movement to the arm 691 and the overdraft shaft 692.

When the add-subtract totalizer wheel 533 is engaged with the actuator 530, the node 683 of the disk 682 is in position to engage the projection 684 of the arm 685, and, when the totalizer wheel passes from "9" to "0," at which time the totalizer changes from the overdrawn position to the positive position, this engagement rotates the arm 685 counter-clockwise back to the position shown in Fig. 11. As the arm 685 moves back into such position, the arm 691 and the shaft 692 are rocked counter-clockwise back to their normal positions.

The usual and well-known "fugitive one" is entered by the shaft 692, when rocked by the disk 682, in the manner shown and described in the above-mentioned Shipley Patent No. 1,791,907, so that the true negative balance may be printed. This mechanism will be briefly described.

As mentioned above, when an overdraft occurs in the add-subtract totalizer, the shaft 692 (Figs. 8, 11, and 19) is rocked clockwise. Secured to the shaft 692 is an arm 715 carrying a pin 716 projecting into a slot 717 of a link 718 pivoted at 719 to an arm 720 secured to a short shaft 721. On the end of the shaft 692 is a roller 722, which cooperates with a cam surface 723 of the link 718 in a manner now to be described.

Whenever the shaft 692 is rocked clockwise, as described above, when an overdraft occurs, the arm 715 rocks clockwise, as viewed in Fig. 19, whereupon the pin 716 rocks the link 718 counter-clockwise about its pivot point 719, during which time the surface 723 of the link 718 engages the roller 722, and, upon continued clockwise movement of the arm 715, the pin, still moving the link 718 counter-clockwise, causes the link to become a toggle and force the arm 720, which is attached to the shaft 721, to be rocked counter-clockwise, as viewed in Fig. 19.

On the other end of the shaft 721, in association with the tens transfer mechanism, connected with the units or lowest order bank, is an arm 730, which carries a usual flat pin 731 (Fig. 9) in engagement with a shoulder 732 of a transfer trip pawl 733, which is normally in the position shown in Fig. 9, wherein its end is in front of a square stud 734 on the transfer segment 540, which is normally urged counter-clockwise by the usual spring 735.

From the above description it will be seen that, whenever the shaft 721 is rocked counter-clockwise (Fig. 8) upon the occurrence of an overdraft in the add-subtract totalizer, the arm 730 is rocked counter-clockwise and moves the flat pin 731 off from the shoulder 732, whereupon the usual coil spring (not shown) rocks the transfer trip pawl 733 clockwise about its pivot 736, thus moving the right end of the trip pawl 733 from in front of the stud 734, whereupon the spring 735 rocks the transfer trip arm 540 counter-clockwise until the square stud is engaged by the usual shoulder 737, thus moving the pinion 533 one step, which is sufficient to cause "1" to be added into the units order of the add-subtract totalizer in order to correct the totalizer, so that, when the amount of a negative total is standing on the totalizer, it can control the differential actuator to correctly print the amount of the overdraft and to correctly calculate the amount of change to be ejected from the change-making mechanism.

*Automatic control of transaction differential*

Whenever an overdraft occurs in the add-subtract totalizer, due to an "Amount Tendered" entry, mechanism automatically arrests the transaction differential in the "2" position when the negative balance is indicated and printed. The beforementioned arm 642 (Fig. 8) is bifurcated to embrace a stud 741 on the arm 715 (Fig. 19). When the arm 715 is rocked, upon entry of the overdraft, the stud 741 rocks the arm 748 to withdraw its end 747 from the path of the stud 746. Thereafter, when the total lever 287 is moved into a total-taking position and the pin 662 releases the arm 660, the end of the latter moves into the path of a shoulder 743 of the segment 657. During this operation, the arm 655 is arrested in a position to arrest the transaction differential in the "2," or "Change," position.

Means, described later, closes certain circuits to cause coins to be automatically delivered from a change-making mechanism during operations in which the transaction differential is arrested in the "2" position.

*Interlock between transaction keys and total lever*

In Fig. 14 is shown the previously-described locking bar 317 with its locking lugs 316. When the total lever 287 is moved into either of its sub-total positions or its item total position, mechanism is operated thereby to move the interlocking bar 317 upwardly one step from the position shown in Fig. 14 to lock out the transaction keys 285 of the transaction bank. This mechanism will now be described.

Secured to the total lever 287 is a plate 775 (Figs. 12 and 14) having a cam race 776, into which projects a pin 777 of a bell crank 778 pivoted on the rod 485. The bell crank 778 also carries a pin 779, projecting into a bayonet slot 780 of a bell crank 781, pivoted on a shaft 782. The bell crank 781 also carries a pin 783, engaged by a hook 784 on the lower end of the interlocking bar 317.

By referring to Fig. 14, it can be seen that, whenever the total lever 287 is moved either up or down, the cam plate 775, through its race 776, rocks the bell crank 778 counter-clockwise, thus rocking the bell crank 781 clockwise a distance sufficient to position all of the lugs 316 beneath the pins 305 of the transaction keys 285.

The cam race 776 is so shaped that, when the total lever 287 is moved into a second or third position out of add position, the lugs 316 are positioned past the pins 305 of all of the keys except the Amount Tendered key. The lug 316 is wide enough to be positioned beneath the pin 305 when the total lever is moved into its second position above add. However, when the total lever is moved into its third position above add, all of the transaction keys are free to be operated.

*Controls by the amount tendered key*

The "Amount Tendered" key 285 controls the differential mechanism (Fig. 7) associated with the transaction bank to stop it in a zero position to select the subtract side of the add-subtract totalizer. If the amount tendered is the same as the amount of the sale, the totalizer will be left at zero. However, if the amount tendered is greater than the amount of the sale, it creates an overdraft in the add-subtract totalizer. Then, when the negative total is taken from the totalizer, coins representing that part of the change are automatically delivered by the change maker. To take this negative total, the total lever is moved into item total position, during which operation the machine indicates the amount of change coming to the customer, and the correct number of coins are automatically delivered. The transaction differential is arrested in zero position by the following mechanism:

Referring to Fig. 12, the pin 305 of the Amount Tendered key 285 is normally in contact with a cam lug 790 on a slide 791 supported on pins 792 carried by the key frame 290 associated with the lowest amount banks.

The lower end of the slide 791 is forked to engage a pin 793 carried by a special zero stop lever 794 (see also Fig. 7), which is pivoted on the rod 485.

A spring 795, attached to the slide 791, holds the slide 791 up in the position shown in Fig. 12, thus retaining the zero stop lever 794 out of the path of movement of the end of the arm 655 (Fig. 7), which is connected to the transaction differential latch by the pin 656.

Means is provided to prevent depression of the Amount Tendered key 285 until after the entry of at least one plus item is made in the add-subtract totalizer and a sub-total operation is performed following this add operation. This mechanism is shown in Fig. 12 and will now be described.

It has just been described how the depression of the Amount Tendered key 285 moves, through its pin 305, the slide 791 downwardly and rocks the special zero stop lever 794 clockwise to position it in the path of the forward end of the arm 655 of the transaction differential to cause the differential mechanism to be stopped in the zero position to select the minus side of the add and subtract totalizer. However, as shown in Fig. 12, this movement of the lever 794 is normally prevented by a stud 800 on the zero stop lever 794 contacting a surface 801 of a slide 802 pivoted to a bell crank 803 pivoted at 804 on the machine side frame. The slide 802 is guided in its movements by a pin 799 on the machine frame. The bell crank 803 is retained in its normal position by a spring 805. Pivoted to the bell crank 803 is a pitman 806, surrounding the main cam shaft 250 and carrying a roller 807, which cooperates with a plate cam 808, secured to the main drive shaft 250.

During each cycle of operation of the machine, the shaft 250 is given one complete clockwise rotation, as viewed in Fig. 12. During the rotation of the shaft 250, the cam 808 moves the pitman 806 to the right to move the bell crank 803 counter-clockwise to raise the slide 802 and remove the surface 801 from the rear side of the stud 800 in the special zero stop lever 794. In add operations, the slide 802 is returned to its normal position by the spring 805. However, during a sub-total operation, it will be recalled, the transaction differential is stopped in the "4" position by the automatic mechanism including the arm 655, the arm 657, and the finger 659 (Figs. 7 and 8). This differential movement of the transaction differential to the "4" position moves the previously-described bar 626 (Fig. 12) to the "4" position. Secured to the side of this bar is a bar 809, having a lug 810 in the position corresponding to the "4" position of the bar 626. Consequently, when the bell crank 803 is rocked counter-clockwise during sub-total operations, a screw stud 811 thereon is raised a like amount, and, when the differential bar 626 stops in the "4" position, the lug 810 is beneath the screw stud 811 and prevents any return movement of the bell crank 803 and the slide 802 by the spring 805, thus holding the surface 801 up away from the rear side of the stud 800 in the special zero stop. Consequently, it can be moved clockwise upon the depression of the Amount Tendered key 285 after a sub-total operation when there is a positive amount in the add-subtract totalizer. The spring 805 holds the stud 811 in contact with the bar 809 or the top of the lug 810, but there is another lock that prevents the special zero stop lever 794 from being moved clockwise until after the entry of a plus item or a series of items, which leaves the add-subtract totalizer in a plus condition prior to the taking of the sub-total, and this mechanism includes a latch 812 pivoted on a shaft 813 supported by the machine frame 292. Secured to the latch 812 is an arm 814. The latch 812 carries a pin 815, against which is held a finger 816 of an arm 817 by a torsion spring 818, one end of which engages the pin 815 on the latch 812 and the other end of said spring 818 is engaged with a pin 819 on the arm 817. The arm 817 is pivoted on the shaft 813. This forms a flexible connection between the latch 812 and the arm 817.

The latch is held against the pin 656 of the differential latch by a torsion spring 820, one end of which engages a pin 821 on the arm 817 and the other end of which is engaged with a radial pin 822 in the shaft 813. The spring 820 rocks the latch 812 and the arm 814 counter-clockwise when the pin 656 is moved upwardly by the transaction differential mechanism.

The pin 656 is shown in the position which it takes after the taking of an item total. Thus the latch 812, which is contacted by the pin 656, is held in the locking position, as shown in Fig. 12, preventing any movement of the zero stop lever 794. However, upon the entry of an item into the plus side of the add-subtract totalizer, the transaction differential arm is rocked clockwise, as has been previously described, and the pin 656 is therefore moved upwardly to release the arm 814 to the influence of the spring 820. This movement of the pin 656 is positioned to put it above the latch 812, and therefore the special zero stop lever 794 is released, so that it may be operated upon depression of the Amount Tendered key 285.

Since both the latch 812 and the slide 802 are moved from behind the stud 800, the operator may enter the amount tendered into the machine and release the machine by the depression of the Amount Tendered key 285.

The upper end of the arm 814 carries a roller 823 projecting into a slot 824 in an arm 825 pivotally supported on a stud 826 carried by the right-hand hanger plate 484. As the arm 814 is rocked counter-clockwise under the influence of the spring 820 in the manner described above, the roller 823, through its engagement with the slot 824, rocks the arm 825 clockwise, thus moving a flattened pin 827 above a shoulder 828 in the previously-described cam plate 775, which is secured to the total lever 287.

Now, when the total lever 287 is moved upwardly into its sub-total position, the shoulder 828 causes the arm 825 to slide upwardly on the stud 826, there being a slot 829 provided, thus moving a finger 830 behind the roller 823 to prevent any clockwise movement of the arm 814 while the total lever 287 is in its sub-total position.

When the total lever 287 is restored to its normal, add, position, the arm 825, due to gravity, slides down on the stud 826, and, when the arm 814 is moved back into the position shown in Fig. 12, the pin 827 is disengaged from the shoulder 828 of the cam plate 775.

*Control of the amount differentials during total-taking operations*

The method of controlling the movement of the amount differentials during total-taking operations is old and well known in the art, as shown in the above-mentioned Shipley patent. A brief description thereof will now be given.

Figure 6:
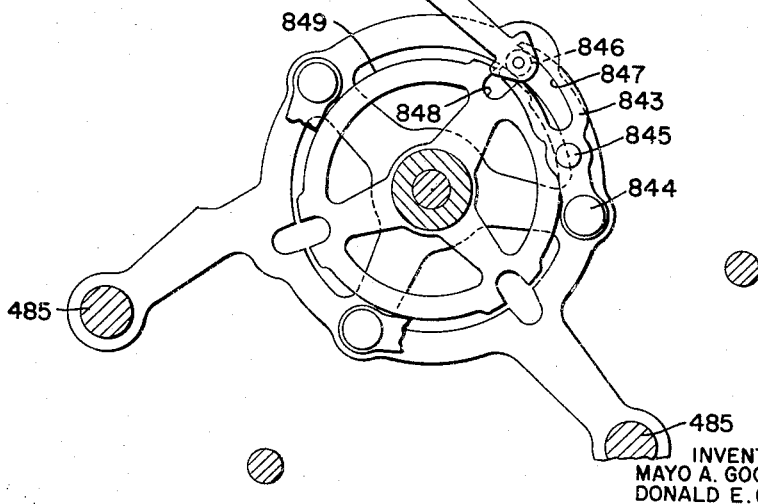
Fig. 6 is a detail side view of the totalizer mechanism for controlling the mechanism of Fig. 5.

Each of the totalizer elements is provided with a long tooth 840 (Fig. 5), which is adapted to engage and rock a bell crank 841 pivoted on a stud 842 carried by the differential hanger. The bell crank 841 is out of the range of movement of the long tooth 840 during adding operations. However, during total-taking operations, the bell crank 841 is moved into the range of movement of the long tooth. When the total lever is moved into a total-taking position, a link 843, pivoted on a stud 844 (Fig. 6), is moved counter-clockwise by engaging a slot in the total lever with a stud 845. Counter-clockwise movement of the link 843 moves a stud 846, engaged in a fork 847 of the link, into a notch 848 of a disk 849. During a total-taking operation, the disk 849 is rocked clockwise. When the disk 849 is so rocked clockwise, the notch 848, engaging with the stud 846, pulls on a link 850 pivoted on an arm 851 pinned to a shaft 852. Also pinned to the shaft 852, adjacent each totalizer element, is a segment 853 engaging a segment arm 854, also pinned on the stud 842 and secured to the beforementioned bell crank 841 by a hub. When the shaft 852 is rocked counter-clockwise (Fig. 5) upon operation of the disk 849, the segment 853 rocks the segment arm 854 and the bell crank 841 clockwise to move one end thereof into the range of movement of the long tooth 840.

Pivoted to one arm of the bell crank 841 is a link 855, having pivoted thereto a link 856 by a stud 857. The link 856 is pivoted to an arm 858, pivoted on a stud 859. A spring 860 normally maintains a toe 861 of the arm 858 in engagement with a stud 862.

When the bell crank 841 is moved into the path of the long tooth 840 of the totalizer element, the links 855 and 856 are straightened by the arm 854, which has a bifurcated lower end embracing the stud 857. Thereupon, when the long tooth 840 is moved into engagement with the bell crank 841 during a total-taking operation, it is rocked counter-clockwise (Fig. 5) and, through the toggle links 855 and 856, rocks the arm 858 clockwise around the stud 859 to move a flange on an arm pivoted to the arm 858 into engagement with one of the notches 864 of the reset spider 1482. The spider 1482, as hereinbefore mentioned, is provided with the notch 481 embracing the stud 488 of the latch arm 489 of the amount differential. When the flange 863, engaging a notch 864, arrests movement of the spider 1482, the stud 488 is arrested, thus causing the bell crank 489 to rotate about its pivot to withdraw the foot 493 from engagement with the differential driver, thus arresting the differential actuator in the position commensurate with the amount standing on the totalizer.

Each of the differential mechanisms closes a circuit to a change-making device for actuating change-making solenoids to eject and deliver coins commensurate with the differential setting of the amount differentials during negative balance operations.

*Coin-selecting switches*

Adjacent the transaction, cents, and dimes differential bank indicator-setting segments 617 and 523 are banks of switch contacts imbedded in insulating material 870. Each bank of switches comprises a line contact and ten individual contacts located in relation to a movable switch and connected to the indicator-setting segments to close a circuit across contacts representing the value of the amount differential setting. Only one set of contacts of the transaction bank is connected in the various circuits, and this one set of contacts is located in the bank of contacts in the location in which the transaction differential is set in the "2" position. As described above, the "2" position is the position in which the transaction differential is arrested by the arm 660 (Fig. 8) when released to move into the path of the shoulder 743 during negative total-taking operations. This is the operation in which coins are automatically delivered. The above circuit will be understood after a consideration of the description of the circuits shown in the circuit diagram (Fig. 15).

The circuits are closed selectively to energize eight solenoids, and two banks of switches adjacent each amount bank for the pennies and dimes banks, respectively, are provided, as shown in Figs. 2 and 3, to obtain delivery of the proper number of coins for each change operation.

The indicator segments 523 for the cents bank (Figs. 1 and 2) have riveted to each side thereof a plate 871, to which are pivoted links 872 and 873. The link 872 is notched to receive a contact member 14 in the shape of a roller grooved to fit into the notch. The contact member 14 rolls over the bank of contacts and is positioned by the differential setting of the cents differential so as to selectively span the contacts and the line switch contact 23.

The link 873 is notched to receive a roller contact 62, which is moved over the bank of contacts to span the space between the selected contacts of the bank of contacts and the line switch plate 63. Springs 874 and 875 maintain roller contacts 14 and 62, respectively, in contact with the bank of contacts.

The dimes bank indicator segment 523 (Fig. 2) is also provided with plates 871, supporting links 872 and 873, in the ends of which are supported both contacts 61 and 120, coacting with banks of contacts and line switch contacts 69 and 119, respectively.

The transaction differential indicator segment 617 is provided with one plate 876, to which is pivoted a link 877, notched to receive a contact roller 28. A spring 878 holds the roller 28 in contact with the bank of contacts to close the circuit across contacts 17 and 20, when the transaction differential is arrested in its "2" position.

By referring to the circuit diagram (Fig. 15), it will be noted that only certain ones of the banks of contacts have wires attached thereto, so that the desired circuits are selected for energizing the proper solenoids A to H (Fig. 15) in the manner described in the consideration of the specific circuits.

*Change delivery mechanism*

In the present disclosure, the change-making mechanism is illustrated as being a separate unit connected to the cash register by a cable. However, the change-making mechanism can be assembled with the cash register to form a unitary machine if desired.

The type of change-making mechanism used to illustrate the invention herein is like that shown in United States Patent No. 1,850,198, issued to Edward J. Brandt on March 22, 1932. The mechanism shown therein is modified herein by substituting solenoids, activated by circuits energized under control of the cash register, for the keys of the patent.

In the Brandt type of machine, when a key is depressed, coins of different denominations are ejected from the coin tray in an amount corresponding to the designating mark upon the particular key depressed. In such machines, the operator must know the amount of change to be issued and must select the key or keys for manual operation. In the present invention, the Brandt machine is modified by the elimination of all depressible keys and by the provision of solenoids to eject coins. The solenoids are energized automatically as an incident to the taking of the negative total from the add-subtract totalizer of the cash register, and the proper coins are thereby automatically delivered without any calculation on the part of the operator.

As shown in Fig. 17, the armature of each of the solenoids A to G (see also Fig. 15) is provided with a link 913, secured to the end of its armature, which link is pivoted to a bell crank 914 pivoted on a shaft 915 carried by frames 916. The lower end of the bell crank 914 has connected thereto a link 917, connected to a plate 918. The plate 918 is supported on rollers 919 and 920. Two tined plates, 921 and 922, provide means for maintaining the plate 918 in proper side spacing. Mounted behind the plate 921 is an assembly of plates 923, which includes two blocks of insulating material. The plate 918 is provided with two downwardly-projecting flanges 924 and 925. When the plate 918 is in its rear position, the flange 925 engages the front edge of a fiber plate of the assembly of plates 923, and, when the plate 918 is in its forward position, the flange 924 engages a rear side of the assembly 923.

Pivotally connected at 926 to each of the sliding plates 918 is a coin-ejecting finger 927, which passes through a plate 928 at the front of the machine and through a slot formed in the lower edge of a coin tray 929. Pivotally connected at 930 to the fingers 927 is a second finger 931, which also passes through the opening in the plate 928 and into the opening in the coin tray. This lower finger 931 normally rests on and is slidable upon a plate 932 in the opening in the coin tray, secured to the inwardly-extending portion 933 of an upwardly-extending flange 934, forming a part of the machine framework. A bolt 935 passes through the fingers 927 and 931 and receives a nut 936, which engages the lower face of the finger 931. A coil spring 937 surrounds the bolt 935 between the fingers and normally holds them in spaced relationship, so that the finger 931 will engage the plate 932 and the finger 927 will be positioned to eject the coins 938, which are supported in the coin tray 929.

The coin tray 929 comprises a back plate 939, a bottom 940, and vertically-extending partitions 941, which provide a plurality of compartments of different sizes to receive stacks of coins of various denominations.

Carried on a rod 945 for swinging movement are longitudinally-spaced coin-engaging members 946, these members extending through openings formed in the back plate 939, so that one of the coin-engaging members will be engaged with each of the stacks of coins carried in the tray. The rear ends 947 of the coin-engaging members are rounded to raise locking levers 948 pivoted on a rod 949, there being one lever 948 for each of the slidable plates 918. A spring 950, attached to each of the levers 948, normally holds a vertical section of the lever 948 in engagement with the rounded end 947 of the member 946. Mounted on the rear end of each lever 948 is a roller 951, movable to engage a finger 952 of an arm pinned to a shaft 953. Secured to the shaft 953 is a spring-actuated arm 954, engageable with one blade of a switch 955 located in the power line circuit (see also Fig. 15). A spring 1956, attached to the switch-operating arm 954, normally maintains the switch arm in a position in which the switch blade 955 remains in its closed position.

The vertically-extending portion of the lever 948 extends in position to be engaged by the rounded portion 947 of the coin-engaging member 946, and, when there are coins in the particular compartment of the coin tray, the coin-engaging member will be held in its rearmost position, as shown in Fig. 17, and will hold the roller 951 in raised position to permit the switch 955 to remain closed. When the stack of coins becomes low, the coin-engaging member 946 will swing into the coin compartment and thereby allow the roller 951 to fall and rock the finger 952, the shaft 953, and the switch arm 954 clockwise (Fig. 17). The switch arm 954 thus opens the switch 955 to open the circuits between the power line and the various solenoids A to H, so that no coins can be ejected. When the roller 951 drops, it comes into the path of an upwardly-extending portion 2956 of the plate 918 and locks the plate against movement; therefore no coins can be ejected. When the switch 955 is open and the plate 918 is locked, notice is given to the operator of the machine that a new supply of coins is necessary.

For a more detailed description of the construction and operation of the coin-ejecting mechanism, reference may be had to the above-mentioned Brandt patent.

The change-making mechanism is provided with a series of relays designated by Roman numerals I to VII inclusive. These relays operate to make and break switches, as shown in the circuit diagram of Fig. 15. The switches are conventionally shown in Figs. 16 and 17, and reference may be had to the circuit diagram (Fig. 15) for the exact construction of the switches operated by the relays I to VII. The relays are mounted on suitable brackets carried by the framework of the machine.

*Control circuits*

The circuits shown in Fig. 15 include the power lines 13 and 18. Before power can be furnished to the various relays and solenoids, four main controlling switches, 955, 956, 957, and 958, must be closed. The switch 955 is controlled by the coins in the coin chutes of the change maker in the manner described above, so that, if there are insufficient coins in the change-maker, this switch will be opened and no coins are ejected.

The control switch 956 is operated during each operation of the machine by mechanism to be described presently, to close a switch at the proper time during the machine cycle, so that the relays I to VII are not activated to energize the coin-ejecting solenoids until the differential mechanisms for selecting the various relays and solenoids have been differentially positioned.

The switch 957 is closed during a machine operation to control the time when the solenoids can be energized.

The switch 958 is closed by the total lever when the total lever is moved into the total-taking position in which the add-subtract totalizer is cleared. This switch and its control are provided to prevent operation of the change-making mechanism in all operations except the one in which change is to be delivered.

The mechanism for closing the switch 958 is illustrated in Fig. 8. A link 960 is pivoted to the total lever 287 at its upper end, and its lower end is pivoted to an arm 961 secured to a shaft 962. Also secured to the shaft 962 is an arm 963, bifurcated to engage a stud 964 on an arm 965. The arm 965 is pivoted on a stud 966 and carries a stud 967, projecting into a cam slot 968 of a lever 959 on the shaft 962.

When the total lever 287 is moved downwardly one step to its total-taking position, the link 960 lowers the arm 961 to rock the shaft 962 and the lever 959 clockwise, thus rocking the arm 965 counter-clockwise. Counter-clockwise movement of the arm 965 rocks, through the stud 964, the arm 963 counter-clockwise to engage a roller 969 on its lower end with one blade of the switch 958 to thereby close the switch. Therefore, when the total lever is moved into position to reset the add-subtract totalizer, the arm 963 closes the switch 958.

The switches 956 and 957 are closed during the machine operation by an arm 970 (Fig. 18) on the main cam shaft 250. The arm 970 is provided with a stud 971 engageable with an arm 972 pinned to a shaft 973. Also pinned to the shaft 973 is an arm 974, the arm 974 being provided with an insulating block 975, normally coacting with switch blades 956 and 957 to maintain them in open position. Springs 976 normally hold the switch blades 956 and 957 against the insulating block 975. When the arm 970 rocks the arm 974 clockwise (Fig. 18), the insulating block releases the switch 956 and 957 to the action of the springs 976 to rock the switch blades around the pivot point 977 to close the switch blades by engagement with switch contacts on a block 978 carried on a bracket 979 on the base of the machine.

Thus, when the total lever 287 is moved into its reset position for resetting the add-subtract totalizer, the switch 958 is closed, and during the machine operation, at the proper time after the differentials in the transaction bank and the amount banks have been properly positioned to close the various circuits (Fig. 15), the switches 956 and 957 are closed to activate the relays and the solenoids, respectively. The switch 955 remains closed as long as there are sufficient coins in the coin chutes. Therefore, at the time during the machine operation in which coins are to be ejected, the four control switches are in closed position.

The circuits for controlling the selections of the proper solenoids A to H are illustrated in the diagram shown in Fig. 15. For the purpose of identification, the relays are indicated by Roman numerals I to VII.

In the description of the circuits, it is assumed that the four control switches 955, 956, 957, and 958 are closed and that the transaction differential is in its "2" position, wherein the roller switch 28 closes a circuit across contacts 19 and 20. Typical circuits will be described, and no attempt will be made to describe all the possible circuits required for all combinations of coins to be ejected.

*Ejecting one cent*

When the machine is operated to clear a negative balance of one cent from the add-subtract totalizer, the cents bank differential is arrested in the position wherein a circuit will be closed across the contacts 15 and 16. When this occurs, the circuit through solenoid C will be closed as follows: One side, 18, of the power line is connected to a switch common 17 through contacts 19 and 20, closed by the control differential roller contact 28 when arrested in the "2" position through lines 21 and 22 to switch common 23 through contacts 14, 15, and 16, lines 24 and 25, to the one-cent solenoid C, through the line 26 and common line 27 to the other side 13 of the power line. This energizes the solenoid C to cause it to eject one cent.

*Ejecting two cents*

When two cents are to be ejected, contacts 35 and 36 are closed by roller contact 14, and therefore one side 18 of the power line is connected to the switch common 23 to a line 34, line 350, to the two-cent solenoid B, the latter being connected by lines 360 and 27 to the side 13 of the power line. This energizes solenoid B to eject two coins.

*Ejecting three cents*

When three cents are to be ejected, solenoids A and C are energized, and their selection is controlled by relay I, which relay closes two switches, one closing a circuit through solenoid A and the other closing a circuit through solenoid C. The circuit through solenoid A is as follows: one side 18 of the power line through switch common 23, contacts 14, 45, and 46, and the latter is connected to relay I by line 44. The other side of relay I is connected to the power line 13 by line 43. Energizing relay I closes two switches, *a* and *c*. One side of the switch *a* is connected to one side 18 of the power line through switch common 17, contacts 19, 28, and 20, lines 21 and 42. The other side of the switch *a* is connected to lines 47 and 48, and the latter is connected to one side of the solenoid A. The other side of the solenoid A is connected through the common line 27 to the other side 13 of the power line. This circuit energizes solenoid A to eject two cents.

One side of the switch *c* is connected to one side of the power line 18, through switch common 17, contacts 19, 28, and 20, line 21, and the other side of the switch *c* is connected to a line 49, and the line 49 is connected to line 25, to solenoid C. The other side of the solenoid C is connected to line 26, the common line 27, to the other side 13 of the power line. This circuit energizes the solenoid C to eject one cent.

Thus, through the medium of relay I and switches *a* and *c*, three cents are ejected when the cents bank differential is arrested in the "3" position.

*Ejecting four cents*

To eject four cents, the solenoids A and B are energized under control of the cents bank differential when in the "4" position. In this setting, current passes from one side 18 of the power line through switch common 17, contacts 19, 28, and 20, lines 21 and 22, line switch 23, contacts 55 and 56 to line 54, relay II, line 43, and to the other side 13 of the power line. Relay II closes switches *a*1 and *b*.

Closing switch *a*1 closes a circuit from one side 18 of the power line through switch common 17, contacts 19, 28, and 20, lines 21 and 42, switch *a*, line 48, solenoid A and to the common line 27 to the side 13 of the power line. This causes two cents to be ejected.

Closing of switch *b* connects one side 18 of the power line through switch common 17, contacts 19, 28, and 20, lines 21 and 42, switch *b*, lines 34 and 350 to solenoid B, line 360, line 27 to the other side 13 of the power line, to cause two cents to be ejected.

Thus solenoids A and B together eject four cents.

*Ejecting five cents*

When five cents is to be ejected, the solenoid D is energized to eject the five-cent coin. Under this condition, the cents amount differential is set at the "5" position, and the ten-cent amount differential is set at zero.

When the cents amount differential is set at the "5" position, the roller contact 62 connects contacts 65 and 66 to connect one side 18 of the power line to line 64, relay III, line 43 to the other side 13 of the power line to close switch *d*.

When the ten-cent amount differential is set at zero, the roller contact 61 closes circuit between contacts 67 and 68. This closes a circuit from the one side 18 of the power line to line 22, switch common 69, contacts 67, 61, and 68, lines 70 and 71 to one side of the switch *d*, and the other side of the switch *d* is connected to one side of the solenoid D through line 72. The other side of the solenoid D is connected to the common line 27 to the other side 13 of the power line. When solenoid D is energized, one five-cent coin is ejected.

*Ejecting 6, 7, 8, or 9 cents*

Reference to the circuit diagram indicates that, when the units amount differential is arrested near the 6, 7, 8, or 9 position, the solenoid D is energized to eject a five-cent coin, since all the contacts for these positions are connected to line 64. Also the switch common 23 is connected to the lines 24, 34, 44, or 54, to eject the proper number of pennies in the manner described above.

*Dimes bank control*

The dimes bank differential is provided with two sets of contacts for selecting relays and solenoids to eject the smallest number of coins of the denominations 50 cents, 25 cents, and 10 cents which will add up to the desired total. The solenoids for ejecting these coins are lettered E, F, G, and H in the circuit diagrams. Certain of the circuits for obtaining these results are described below.

*Ejecting one dime*

When the dime differential mechanism is arrested in the "1" position, roller contact 61 connects the dime switch common 69 to line 80 by spanning contacts 81 and 82. This closes a circuit from one side 18 of the power line through line 22, switch common 69, contacts 81 and 82, line 80 to relay IV, and through line 43 to the other side 13 of the power line. Relay IV closes a switch f, and, if the penny differential is arrested in zero position, a switch f1 is not opened by the relay III. Under this adjustment, a circuit is closed from one side 18 of power line, line 42 through the switch f, through lines 83 and 84 to switch f1, and through line 85 to the solenoid F, line 27, thence to the other side 13 of the power line. This causes the solenoid F to eject one dime.

Ejecting two dimes

When the dime differential mechanism is arrested in the "2" position, two dimes are ejected. When in such position, a circuit is closed from the one side 18 of the power line, through switch common 69 and contacts 61, 91, and 92, line 90 to relay V, line 43 to the other side 13 of the power line. Relay V closes switches f2 and e. Closing switch f2 closes a circuit from the power line 18, line 42 to the line 84, switch f1, line 85 and solenoid F, line 27, thence to the other side 13 of the power line.

Closing switch e closes a circuit from the power line 18, line 42 through a line 93, switch e1, lines 94 and 95, to solenoid E, line 27, to the power line 13. This activates solenoid E to eject one dime. Thus, when the dimes differential is arrested in the 2, or "20-cent," position, both solenoids E and F are activated to eject two dimes.

Ejecting thirty cents

When the dime amount differential is arrested in the thirty-cent position, solenoids D and G are activated to eject a 5-cent coin and a 25-cent coin, respectively, by the following circuits: The circuit is closed from one side 18 of the power line, line 22, switch common 69 across contacts 101, 61, and 102, line 100, relay VI, line 43, to the other side 13 of the power line. Relay VI closes switch g to close a circuit from the power line 18, line 42 through the line 103 through solenoid C, line 27, to the power line 13. Relay VI also closes switch d2 to close a circuit from power line 18, line 21, line 42, through line 104, switch d1, line 72, solenoid D, line 27, to the power line 13.

Thus, when the dimes differential is arrested in thirty-cent position, solenoids D and G are activated to eject a five-cent coin and a twenty-five cent coin.

Ejecting forty cents

When the dimes amount differential is arrested in the 40-cent position, solenoids D, E, and G are activated to eject a 5-cent coin, a 10-cent coin, and a 25-cent coin, respectively, by the following circuits. A circuit is closed from one side 18 of the power line, line 22, through switch common 69 across the contacts 111 and 112, line 110, relay VII, line 43, to the other side 13 of the power line. Relay VII closes switch d3, e2, and g1, to close circuits through solenoids D, E, and G. A circuit is closed from the power line 18, line 21, line 42 through the switch d3, line 104, switch d1, line 72, solenoid D, line 27 to the power line 13. A second circuit is closed from power line 18, line 21, line 42 to the switch e2, line 94, line 95, and through the solenoid E, line 27 to the power line 13. A third circuit is closed from the power line 18, line 21, line 42, through the switch g1, line 113, line 103, and through the solenoid G, line 27, to the power line 13.

Thus, when the dimes differential is arrested in the 40-cent position, the solenoids D, E, and G are activated to eject a five-cent coin, a ten-cent coin, and a twenty-five-cent coin.

Ejecting fifty cents

When the dimes amount differential is arrested in the 50-cent position, the solenoid H is activated to eject a 50-cent coin by the following circuits. A circuit is closed from the one side 18 of the power line, line 22, through the switch common 119, contacts 120, 121, and 122, line 123 through solenoid H, line 27, to the other side 13 of the power line.

It may be stated here that, when change of 60, 70, 80, and 90 cents is issued, the same circuit is closed through the solenoid H to eject a 50-cent coin, and the circuit is also closed through the solenoids E and F in the proper combinations to issue the proper number of dimes in the manner described above.

Ejecting seventy-five cents

When the dimes bank is arrested in the 70-cent position and the cents bank is arrested in the 5-cent position, the solenoids G and H are activated to issue a 50-cent coin and a 25-cent coin. In this setting of the amount differentials, the relays III and V are energized by the following circuits. The before-described circuit from the switch common 63, through contacts 65 and 66, line 64, through relay III, to line 43 is closed. At this time, no circuit is closed to the five-cent solenoid, since relay III opens the switch d1. However, relay III closes a switch g2.

A second circuit is closed from one side 18 of the power line, line 22, to the switch common 69, contacts 131 and 132, line 90, relay V, line 43, to the side 13 of the power line. Relay V closes switch g3.

Since the switches g2 and g3 are now closed, a circuit is closed from one side 18 of the power line through line 42, switch g2, line 133, switch g3, line 113, line 103, to the solenoid G, line 27, and to the other side 13 of the power line to eject a 25-cent coin.

A third circuit is closed from one side 18 of the power line, line 22, through the switch common 119, contacts 141 and 142, line 123, to the solenoid H, line 27, and back to the power line 13. Solenoid G ejects a 50-cent coin.

Ejecting eighty-five cents

When the dimes differential is arrested in the 80-cent position and the cents bank is arrested in the 5-cent position solenoids F, G, and H are activated to eject a 50-cent coin, a 25-cent coin, and a 10-cent coin.

In this setting of the amount differentials, the relays III and VI are energized by the following circuits.

The relay III is energized by the before-mentioned circuit from one side 18 of the power line, line 22, through the switch common 63, contacts 65 and 66, line 64, relay III, line 43, to the side 13 of the power line. This closes switch f5. The relay VI is energized by the before-described circuit over line 100, which closes switch f3. When the switches f3 and f5 are closed, a circuit is closed from one side 18 of the power line, line 42, through the switch f3, lines 134 and 135 through the switch f5 to solenoid F, and to the line 27 and line 13 of power circuit. Solenoid F ejects the 10-cent coin.

Energizing the relay VI also closes switch g to close a circuit from one side 18 of the power line, the line 42, through switch g and line 103 to the solenoid G, line 27, and back to the power line 13. Solenoid G ejects a 25-cent coin.

The dimes amount differential also closes a circuit from the power line 18, line 22, to switch common 119 through contacts 151 and 152 and line 123, through solenoid G, line 27, and back to the power line 13. Solenoid G ejects the 25-cent coin

Ejecting forty-six cents

When the dimes amount bank differential is arrested in the 40-cent position and the cents amount differential is arrested in the six-cent position, solenoids C, E, F, and G are activated. In this setting of the amount differentials, the relays III and VII are energized.

Solenoid C is activated to eject a one-cent coin by a circuit from the power line 18, line 22, switch common 23, contacts 153 and 154, lines 24 and 25, solenoid C, lines 26 and 27 to the power line 13.

Solenoid E is activated to eject a 10-cent coin by a circuit closed by the relays III and VII.

Relay III is energized by a circuit from one side 18 of the power line, line 22, switch common 63, contacts 149 and 150, line 64, relay III, line 43, back to power line 13. This closes switch f5.

Relay VII is energized by a circuit from one side 18 of the power line, line 22, switch common 69, contacts 111 and 112, line 110, relay VII, line 43, to power line 13. This closes switches e2, f4, and g1.

Solenoid E is activated to eject one 10-cent coin by a circuit from the power line 18, line 42, switch e2, lines 94 and 95, solenoid E, line 27, to the power line 13.

Solenoid F is activated to eject one 10-cent coin by a circuit from power line 18, line 42, switch f4, line 135, switch f5, line 85, solenoid F, line 27, to the power line 13.

Solenoid G is activated to eject a 25-cent coin by a circuit from the power line 18, line 42, switch g1, circuits 113 and 103, solenoid G, line 27, back to power line 13.

*Ejecting sixty-five cents*

When the dimes amount differential is arrested in the 60-cent position and the cents bank differential is arrested in the five-cent position, the solenoids D, E, and H are activated to eject a 25-cent coin, a 10-cent coin, and a 5-cent coin.

In this setting of the amount differentials, the relays III and IV are energized.

The relay III is energized by a circuit from the power line 18, line 22, switch common 63, contacts 65 and 66, line 64, relay III, line 43, to the power line 13. This closes switches d and e3.

The relay IV is energized by a circuit from the power line 18, line 22, switch common 69, contacts 161 and 162, line 80, relay IV, line 43, to the power line 13. This closes switches e4 and d4.

Circuit is thus closed through the solenoid D from the power line 18, line 42, switch d4, lines 70 and 71, switch d, line 72, solenoid D, line 27, to power line 13. This causes the solenoid D to eject one 5-cent coin.

A circuit is also closed to the solenoid E from power line 18, line 42, switch e4, a line 155, switch e3, lines 94 and 95, solenoid E, line 27, to the power line 13. This causes solenoid E to eject one 10-cent coin.

A circuit is also closed to the solenoid H by a circuit from the power line 18, line 22, switch common 119, contacts 141 and 142, line 123, solenoid H, line 27 to the power line 13. This causes solenoid H to eject one 50-cent coin.

The above are typical circuits for activating solenoids A to H and are believed to be sufficient to explain how the solenoids are activated singly or in combination to eject change represented by the balance indicated by the positions of the amount differentials of the cash register during operations in which a negative total is taken from the add-subtract totalizer.

What is claimed is:

1. In a machine of the class described having an add-subtract totalizer capable of receiving a plurality of positive and a plurality of negative entries to create negative balances in the totalizer, the combination of means differentially set under control of the totalizer to represent a negative balance in the totalizer, mechanism to control the machine for reading the balance on the totalizer, a coin-dispensing mechanism, devices selectively operated under control of said means during a balance reading operation to dispense coins of a value commensurate with the negative balance in the totalizer, control means settable to a plurality of positions by the totalizer, each position being characterized as to whether there is a positive or negative balance on the totalizer and movable means positioned by the control means to render the dispensing mechanism active when the balance in the totalizer is negative.

2. In a machine of the class described having an add-subtract totalizer capable of receiving a plurality of positive and a plurality of negative entries to create negative balances in the totalizer, the combination of means differentially set under control of the totalizer to represent a negative balance in the totalizer, mechanism to control the machine for reading the balance on the totalizer, a coin-dispensing mechanism, devices selectively operated under control of said means during a balance reading operation to dispense coins of a value commensurate with the negative balance in the totalizer, a settable means set by the totalizer when the totalizer is overdrawn to create a negative balance, differential mechanism set under control of the settable means when the settable means is in said set position, and means positioned by the differential mechanism to render the dispensing mechanism active when the balance in the totalizer is negative.

3. In a machine of the class described having an add-subtract totalizer capable of receiving a plurality of positive and a plurality of negative entries to create negative balances in the totalizer, the combination of means differentially set under control of the totalizer to represent a negative balance in the totalizer, mechanism to control the machine for reading the balance on the totalizer, a coin-dispensing mechanism, devices selectively operated under control of said means during a balance reading operation to dispense coins of a value commensurate with the negative balance in the totalizer, control means settable to a plurality of positions by the totalizer, each position being characterized as to whether there is a positive or negative balance on the totalizer, movable means positioned by the control means to render the dispensing mechanism active when the balance in the totalizer is negative, and means operated during a machine cycle to determine the time during said cycle that said dispensing mechanism is operated.

4. In a machine of the class described having an add-subtract totalizer capable of receiving a plurality of positive and a plurality of negative entries to create negative balances in the totalizer, the combination of means differentially set under control of the totalizer to represent a negative balance in the totalizer, mechanism to control the machine for reading the balance on the totalizer, a coin-dispensing mechanism, devices selectively operated under control of said means during a balance reading operation to dispense coins of a value commensurate with the negative balance in the totalizer, a settable means set by the totalizer when the totalizer is overdrawn to create a negative balance, differential mechanism set under control of the settable means when the settable means is in said set position, means positioned by the differential mechanism to render the dispensing mechanism active when the balance in the totalizer is negative, and means operated during a machine cycle to determine the time during said cycle that said dispensing mechanism is operated.

5. In a machine of the class described having an add-subtract totalizer capable of receiving a plurality of positive and a plurality of negative entries to create a negative balance in the totalizer, the combination of means differentially set under control of the totalizer to represent a negative balance in the totalizer, a coin-dispensing mechanism, electro magnets for operating the dispensing mechanism to dispense coins commensurate with the negative balance in said totalizer, a plurality of circuits for controlling the operation of the electro magnets, switches selected and closed by the means differentially set under control of the totalizer to select circuits from the plurality of circuits to selectively actuate the electro magnets to issue coins, a settable means set to one position when the balance in the totalizer is positive and to another position when the totalizer is negative, a differential mechanism, a stop arm to control the differential movement of the differential mechanism, said stop arm movable under control of the settable means, whereby the differential is arrested in a certain position when the total in the totalizer is negative, stationary switch contacts in the power circuit, and a movable contact moved into position to engage the stationary switch contacts to close the circuit from the power line through said selected circuits to render the selected circuits active when the balance in the totalizer is negative during a machine operation.

6. In a machine of the class described having an add-subtract totalizer capable of receiving a plurality of positive and a plurality of negative entries to create a negative balance in the totalizer, the combination of means differentially set under control of the totalizer to represent a negative balance in the totalizer, a coin-dispensing mechanism, electro magnets for operating the dispensing mechanism to dispense coins commensurate with the negative balance in said totalizer, a plurality of circuits for controlling the operation of the electro magnets, switches selected and closed by the means differentially set under control of the totalizer to select circuits from the plurality of circuits to selectively actuate the electro magnets to issue coins, a settable means set to one position when the balance in the totalizer is positive and to another position when the totalizer is negative, a differential mechanism, a stop arm to control the differential movement of the differential mechanism, said stop arm movable under control of the settable means, whereby the differential is arrested in a certain position when the total in the totalizer is negative, stationary switch contacts in the power circuit, a movable contact moved into position to engage the stationary switch contacts to close the circuit from the power line through said selected circuits to render the selected circuits active when the balance in the totalizer is negative during a machine operation, a control switch in the power line closed during a machine operation to control the time of operation of the electro magnets, and means to actuate the switch.

7. In a machine of the class described, having an add-subtract totalizer capable of receiving a plurality of positive and a plurality of negative entries to calculate negative and positive balances in the totalizer, the combination of means settable under the control of the totalizer to represent the balance in said totalizer, control means under control of the totalizer and operable to one or another position to indicate a positive or negative balance, a coin-dispensing mechanism, devices selectively controlled by said first-named means to control the dispensing mechanism for dispensing coins from the coin-dispensing mechanism of a value commensurate with the balance in the totalizer, and means jointly controlled by the mechanism for controlling the machine for reading the balance and by the control means when operated to a position to indicate a negative balance for causing the devices to be operated to cause the coins to be dispensed when said control means indicates a negative balance.

8. In a machine of the class described, having an add-subtract totalizer capable of receiving a plurality of positive and a plurality of negative entries to calculate negative and positive balances, the combination of means settable under control of the totalizer to represent a negative or positive balance in said totalizer, mechanism to control the machine for reading the balance on the totalizer, control means under control of the totalizer to indicate a positive or negative balance, a coin-dispensing mechanism, devices jointly controlled by the control means when in a position according to a negative balance and the mechanism for controlling the machine for reading the balance on the totalizer and selectively actuated under control of said first-mentioned means during a balance-reading operation to dispense coins from the coin-dispensing mechanism of a value commensurate with the balance in the totalizer when said control means indicates a negative balance, and means operated during a machine cycle to determine the time during said cycle that said dispensing mechanism is operated.

References Cited in the file of this patent
UNITED STATES PATENTS

| | | |
|---|---|---|
| 1,034,500 | Von Pein | Aug. 6, 1912 |
| 1,279,053 | Werner | Sept. 17, 1918 |
| 1,290,429 | Von Pein | Jan. 7, 1919 |
| 1,356,379 | McDermott | Oct. 19, 1920 |
| 1,592,468 | Shepard | July 13, 1926 |
| 1,834,561 | Watson | Dec. 1, 1931 |
| 2,076,564 | Hoban | Apr. 13, 1937 |
| 2,083,947 | Furber | June 15, 1937 |
| 2,208,515 | Mills | July 16, 1940 |
| 2,682,993 | Helgeson | July 6, 1954 |
| 2,728,521 | Benson et al. | Dec. 22, 1955 |
| 2,775,403 | Hall et al. | Dec. 25, 1956 |
| 2,805,675 | Noyes | Sept. 10, 1957 |